(12) United States Patent
Yim

(10) Patent No.: US 6,364,251 B1
(45) Date of Patent: Apr. 2, 2002

(54) AIRWING STRUCTURE

(76) Inventor: James H. Yim, 4972 Hemlock Ave., Irvine, CA (US) 92612

( * ) Notice: Subject to any disclaimer, the term of this patent is extended or adjusted under 35 U.S.C. 154(b) by 0 days.

(21) Appl. No.: 09/574,281

(22) Filed: May 19, 2000

(51) Int. Cl.[7] .............................................. B64D 17/02
(52) U.S. Cl. .................. 244/153 R; 244/900; 244/145; 244/16; 244/123
(58) Field of Search .............................. 244/154, 153 R, 244/900, 901, 16, 123, 145; 114/102, 39.1, 39.2

(56) References Cited

U.S. PATENT DOCUMENTS

| | | | | |
|---|---|---|---|---|
| 3,995,799 A | * | 12/1976 | Bartolini | 244/900 |
| 4,116,406 A | | 9/1978 | Hamilton | 244/16 |
| 4,198,019 A | | 4/1980 | Linczmajer | 244/123 |
| 4,601,443 A | | 7/1986 | Jones | 244/13 |
| 4,651,665 A | | 3/1987 | Drake | 114/39 |
| 4,708,078 A | | 11/1987 | Legaignoux et al. | 114/102 |
| 4,742,977 A | * | 5/1988 | Crowell | 244/900 |
| 4,815,681 A | | 3/1989 | Crowell | 244/153 |
| 5,160,100 A | | 11/1992 | Snyder | 244/13 |
| 5,213,289 A | * | 5/1993 | Barresi | 244/145 |
| 5,366,182 A | | 11/1994 | Roesler et al. | 244/155 |
| 5,810,284 A | | 9/1998 | Hibbs et al. | 244/13 |
| 5,826,530 A | | 10/1998 | Tuurna et al. | 114/102 |

* cited by examiner

Primary Examiner—J. Woodrow Eldred
(74) Attorney, Agent, or Firm—John K. Park; Park & Sutton LLP

(57) ABSTRACT

The airwing structure according to the present invention comprises of an airfoil structure, a main frame, and a means for providing a downward and a forward tension on the airfoil structure. The airfoil structure further comprises of a leading edge, a trailing edge, a left edge, a right edge, a central wing root, and a plurality of chord lines. Moreover, the airfoil structure comprises of a substantially flexible surface skin and the airfoil structure also has a downward arc for producing lift by aerodynamic forces exerted thereon. The main frame attached to the airfoil structure comprises of a leading bar and a supporting bar. The leading bar is fixedly attached to the leading edge supporting and maintaining the leading edge from collapsing. The supporting bar is attached to the leading bar and attached to the trailing edge supporting and maintaining the airfoil structure from collapsing.

103 Claims, 24 Drawing Sheets

AIRWING STRUCTURE

BACKGROUND

This present invention relates to a flying wing structure, and more particularly to a flexible airwing structure. The present invention provides an improvement of the flying wing, such as a paraglider, by having minimized load lines and control lines, a simple and light-weight structure, extra carrying capacity, and easier flight control.

A conventional paraglider comprises of an airfoil canopy for producing a lift by the aerodynamic force exerted thereon, a plurality of flexible load lines connected to the canopy, a left and a right suspension means connected to the left side and the right side load lines respectively for supporting a rider to be suspended from the canopy by the load lines in a flight supporting position, wherein the rider can be a person or a paramotor having a center of gravity and a directional axis extending substantially in the direction of the flight of the rider in the flight supporting position.

In comparison with the frame supported by a heavy hang glider, the paraglider can carry more load weight due to its airfoil structure. The paraglider is easy to carry and storage because of its lightweight and compact size when not in use. However, the hundreds of load lines complicate the flying control and its use. Moreover, the rider cannot elevate in the air with a paraglider unless an electric or gasoline powered paramotor is used to produce a forward thrust and control the climb, descent, and level flight.

The dangers of flying paraglider include the collapse of the paraglider while in flight and the difficulty of preventing the load lines form being entangled. Moreover, there is no apparent solution to the unstable swing of the pilot of the paraglider during a sudden wind condition.

For the foregoing reasons, there is a need for a new and improved flying wing structure having minimized load lines and control lines, a simple and light-weight structure, extra carrying capacity, and easier flight control.

SUMMARY

This present invention relates to a flying airwing structure, providing a substantial improvement over the prior flying wing structures, such as a paraglider, by having minimized load lines and control lines, a simple and light-weight structure, extra carrying capacity, and easier flight control.

Therefore, an objective of the present invention is to provide an airwing structure for aircrafts or similar flying objects which are easy to control and operate. Another objective of the present invention is to provide an airwing structure that minimizes the supporting frames and/or loading and suspension lines to reduce the weight and the manufacturing cost of the airwing structure.

Another objective of the present invention is to provide an airwing structure, comprising of a ram air inflatable airfoil canopy and an airwing frame supporting the airfoil canopy to form an airwing for carrying a vehicle body, that can be powered by a relatively small engine of small output, whether gasoline or electrical. Additionally, because of low energy requirement due to the efficiency of the airwing structure, another objective of the present invention is to provide an airwing structure for supporting a pilot in air, wherein the pilot can operate the airwing to regulate the climb, descent, airborne steering, and level flight without the need of gasoline or electrical power. Another objective is to provide a quiet and nearly silent operation of the airwing structure through its remarkable efficiency. Additionally, due to its quietness and low power requirement, it is an objective of the present invention to be able to provide quiet surveillance over an area over a long period of time.

Another objective of the present invention is to provide an airwing structure for constructing a powered aircraft that is easy to launch, take off, and control during the flight, while providing a substantial safety. Therefore, it is an objective of the present invention to provide an airwing structure that is easy to pilot as to enable safe solo flights by relatively inexperienced persons.

Another objective of the present invention is to provide an airwing structure that is able to have a vehicle body adapted to suspend below the airwing for a distance equal to or less than half the length of the airwing. Moreover, it is an objective to combine the usefulness of the rear wing, the rudders, and the stabilizers to the airwing structure.

Another objective of the present invention is to provide an airwing structure that is easily controlled using a remote control, while the cost of the airwing structure remains very low for various toy applications. Moreover, it is an objective of the present invention to simulate the flying creatures, such as birds and pterodactyls, which can be controlled remotely. Furthermore, it is an objective of the present invention to collapse the airwing structure for easy storage and transportation.

All of the above mentioned objectives can be achieved by the present invention. The airwing structure according to the present invention comprises of an airfoil structure, a main frame, and a means for providing a downward and a forward tension on the airfoil structure. The airfoil structure further comprises of a leading edge, a trailing edge, a left edge (or otherwise referred to as a left wing tip), a right edge (or otherwise referred to as a right wing tip), a central wing root, a thrust line (a line of thrust of air during the flight), and a plurality of chord lines. Moreover, the airfoil structure comprises of a substantially flexible surface skin and the airfoil structure also has a downward arc for producing lift by aerodynamic forces exerted thereon.

The main frame comprises of a leading bar and a supporting bar. The leading bar is fixedly attached to the leading edge supporting and maintaining the leading edge from collapsing. The supporting bar is attached to the leading bar and attached to the trailing edge supporting and maintaining the airfoil structure from collapsing.

The means for providing a downward and a forward tension on the leading bar allows the chord lines of a substantial portion of the airfoil structure to be aligned with the central wing root and the thrust line; making the chord lines to have the same angle of attack with the central wing root and the thrust line during the flight condition. It is important aspect of the invention that the means for providing a downward and a forward tension on the leading bar maintains the downward tension and the forward tension simultaneously on the leading bar. This simultaneous downward tension and the forward tension allow the airwing to maintain the desired shape for the flight, and sets this invention apart from all other prior art, including U.S. Pat. No. 5,160,100 to Snyder, and U.S. Pat. No. 4,601,443 to Jones, et al, which do not provide for the forward tension of the airwing.

The control of the airwing can be easily accomplished by moving the left edge and/or the right edge up and down. One way to move the left edge or the right edge up or down is to pull down a portion of the left edge or the right edge, or pull down a portion of the airfoil structure. Additionally, the means for providing a downward and a forward tension can also be used to move the left edge and the right edge to control the lift and the movement of the airwing structure.

The preferred version of the airwing structure uses a parafoil as the airfoil. The parafoil comprises of an air inflatable airfoil-shaped canopy that has plurality of air intake openings at the leading edge, allowing the air to inflate the airfoil-shaped canopy. The preferred version of the inflatable airfoil-shaped canopy further comprises of a plurality of air cells extending from about the leading edge to about the trailing edge. The air cells comprises of ribs formed of substantially airfoil shape, wherein the ribs are connected between the top skin and the bottom skin forming the air cells. As a further improvement, the air cells can have numerous communicating holes which allow the air communication between adjacent air cells.

Moreover, the preferred version of the airfoil structure further comprises of a left stiffening rod and a right stiffening rod. The left stiffening rod attaches to the leading edge and to the left edge substantially towards the trailing edge and the right stiffening rod attaches to the leading edge and to the right edge substantially towards the trailing edge to tighten the trailing edge and to give stiffness to the left edge and the right edge respectively. Alternatively, a single stiffening rod can be used in lieu of the left stiffening rod and the right stiffening rod.

For a smaller application of the present invention, the airwing structure can be a folding structure for the convenience of storage and transportation. For a larger application or for a simulation of flying creatures, a fuselage can replace the supporting bar.

A preferred version has a thrusting means, such as an engine with a propeller, attached to the airwing structure. Such a thrust means, or a plurality of thrust means, can be attached to the supporting bar or to the leading bar.

A load can be carried by the airwing structure. A load bearing member can be attached to the leading bar or the supporting bar. The load bearing member can carry a load or a cavity to carry a load at the end of the load bearing member. The preferred version of the present invention has the load bearing member attached to the supporting bar on or about the center of gravity of the airfoil. If the thrust means is attached to the load or the cavity carrying the load, then the most of the available thrust can be transferred as the useful energy when the load bearing member is attached to the supporting bar on or about the center of gravity of the airfoil.

A preferred version of the present invention has a forward extension that extends beyond the leading edge. This forward extension can be used to provide a forward tension on the leading bar, and also can be used to provide a downward tension on the leading bar simultaneously. However, it is common to have the forward extension provide the forward tension while the downward tension on the leading bar is provided by either a preformed downward arc or a set of strings or bars attached to the lower portion of the airwing structure, such as the load bearing member or the outer skin of the cavity, providing the downward tension. The simultaneous downward tension and the forward tension allow the airwing to maintain the desired shape for the flight.

When the downward tension is provided from a set of strings or bars attached to the lower portion of the airwing structure, such as the load bearing member or the outer skin of the cavity, then control of the airwing can be easily performed remotely. A controlling means can be provided by having a control arm with a left tip and a right tip, a left tension bearing member, and a right tension bearing member, whereby the left tension bearing member is attached about the left tip or the left wing portion and the right tension bearing member is attached about the right tip or the right wing portion so that a rotation of the control arm controls the airwing structure by adjusting the tension on either or both the left tension bearing member and the right tension bearing member.

Although the present invention has been thus summarized in this section, a fuller understanding of the present invention, along with the realization of the objectives aforementioned, can be obtained by the appended figures, description, and claims.

DESCRIPTIONS OF FIGURES

DETAILED DESCRIPTION

Figure 1:
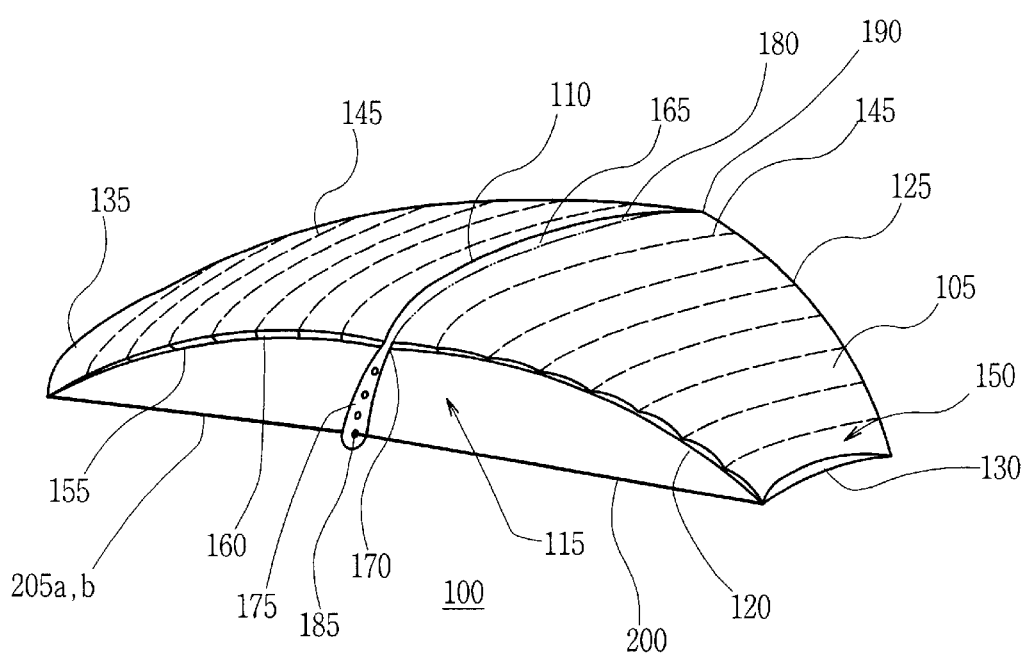
FIG. 1 is a perspective view of the present invention in its simplest version.

This present invention relates to a flying airwing structure 100, providing a substantial improvement over the prior flying wing structures, such as a paraglider, by having minimized load lines and control lines, a simple and lightweight structure, extra carrying capacity, and easier flight control.

Referring to FIG. 1 through FIG. 4, the airwing structure 100 according to the present invention comprises of an airfoil structure 105, a main frame 110, and a means for providing a downward and a forward tension 115 on the airfoil structure 105. The airfoil structure further comprises of a leading edge 120, a trailing edge 125, a left edge 130, a right edge 135, a central wing root 140, a thrust line 141 (a line of thrust of air during the flight, represented by the black arrow), and a plurality of chord lines 145. Moreover, the airfoil structure 105 comprises of a substantially flexible surface skin 150 and the airfoil structure 105 also has a downward arc 155 for producing lift by aerodynamic forces exerted thereon.

The main frame 110 comprises of a leading bar 160 and a supporting bar 165. The leading bar 160 is fixedly attached to the leading edge 120 supporting and maintaining the leading edge 120 from collapsing. The supporting bar 165 is attached to the leading bar 160 and attached to the trailing edge 125 supporting and maintaining the airfoil structure 105 from collapsing. The supporting bar 165 prevents the trailing edge 125 from freely flap around, securing the shape of the airfoil structure 105, distinguishing from U.S. Pat. No. 4,601,443 to Jones, et al which allows the trailing edge 125 to be detached from any and all structure.

The leading bar 160 and the supporting bar 165 of the main frame 110 are joined together forming a junction 170 allowing the supporting bar 165 to have a forward extension 175 and a rear extension 180. The forward extension 175 has a forward tip 185 and the rear extension 180 having a rear tip 190, wherein the forward extension 175 extends beyond the leading edge 120 opposite from the rear extension 180.

The means for providing a downward and a forward tension 115 on the leading bar 160 allows the chord lines 145 of a substantial portion of the airfoil structure 105 to be aligned with the central wing root 140 and the thrust line 141; making the chord lines 145 to have the same angle of attack 195 with the central wing root 140 and the thrust line 141 during the flight condition. It is important aspect of the invention that the means for providing a downward and a forward tension 115 on the leading bar 160 maintains the downward tension and the forward tension simultaneously on the leading bar 160 to tighten the substantially flexible surface skin 150. This simultaneous downward tension and the forward tension allow the airwing to maintain the desired shape for the flight.

Figure 1A:
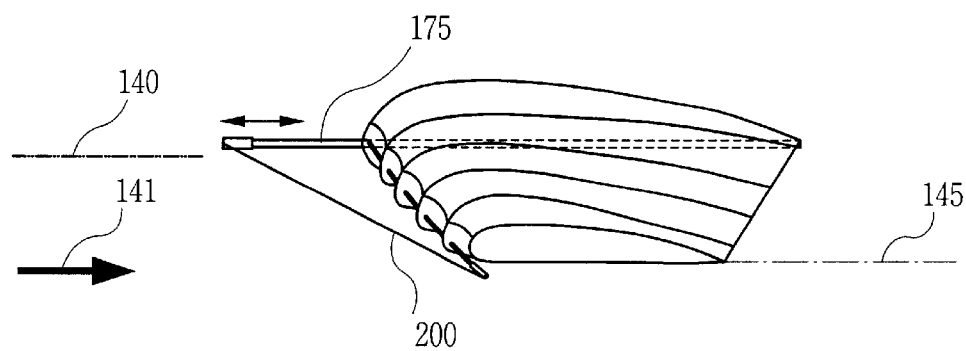
FIGS. 1a through 1f are sectional views of the present invention showing the various flight conditions.
Figure 1B:
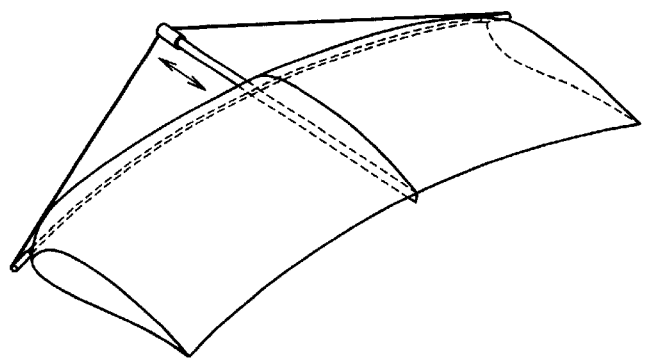

FIG. 1a and FIG. 1b illustrate the chord lines 145 of a substantial portion of the airfoil structure 105 substantially parallelly aligned with the central wing root 140 and the thrust line 141. This alignment is the wing alignment during the normal operation of the present invention. This alignment is possible because of the simultaneous downward and forward tension on the leading bar 160 substantially about the left edge 130 and substantially about the right edge 135 of the airfoil structure 105 to tighten the substantially flexible surface skin 150, making the chord lines 145 of a substantial portion of the airfoil structure 105 to be aligned with the central wing root 140 and the thrust line 141 during the flight condition.

Figure 1C:
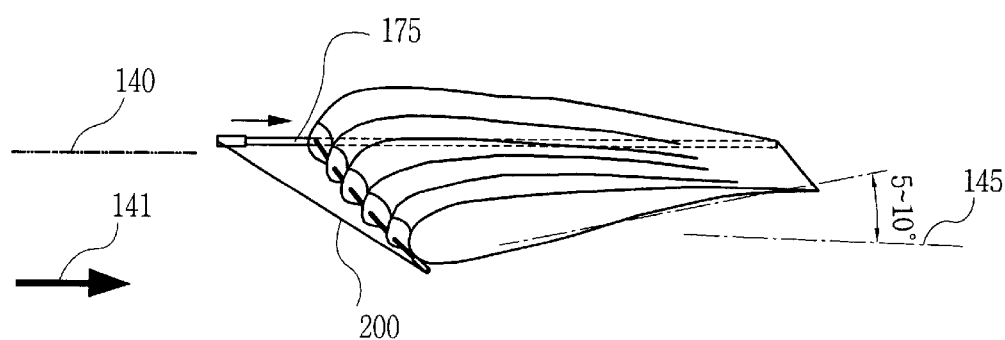
Figure 1D:
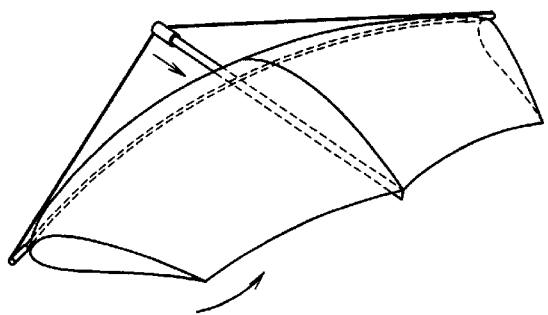
Figure 1E:
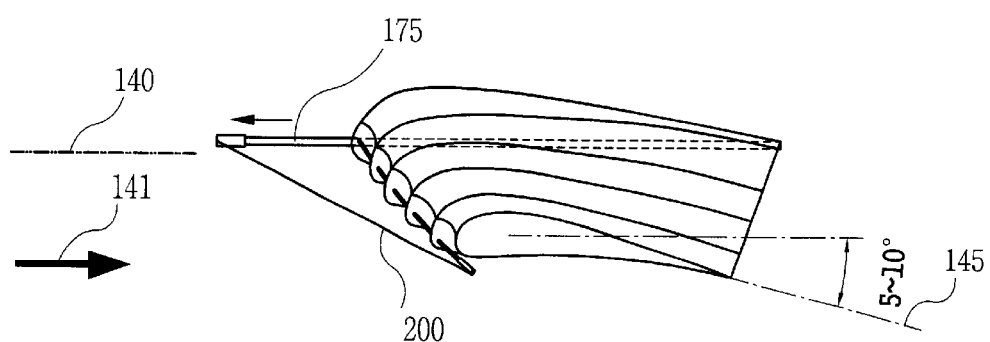
Figure 1F:
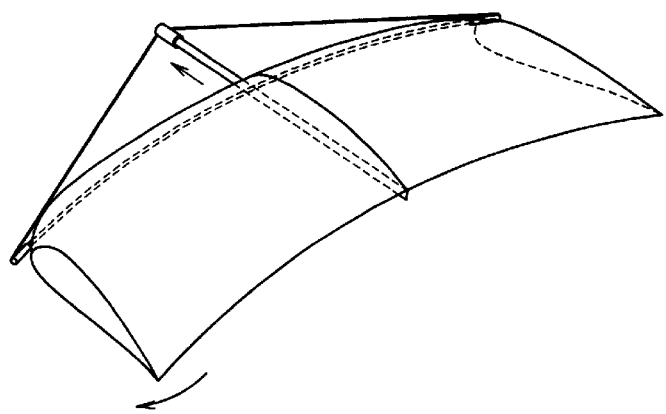
Figure 2:
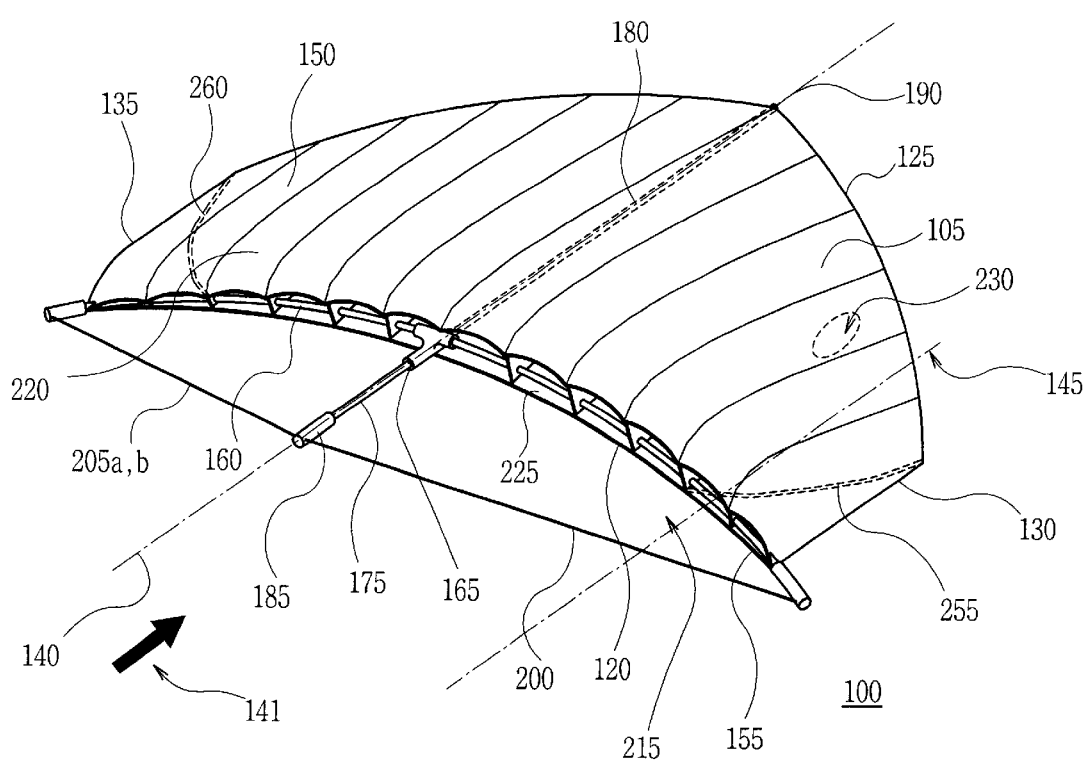
FIG. 2 is a perspective view of the present invention with a parafoil.
Figure 3:
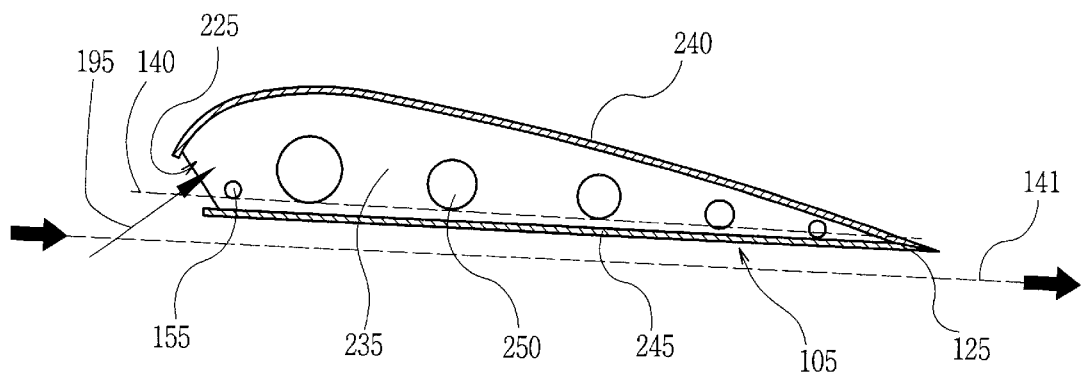
FIG. 3 is a sectional view of the parafoil.
Figure 4:
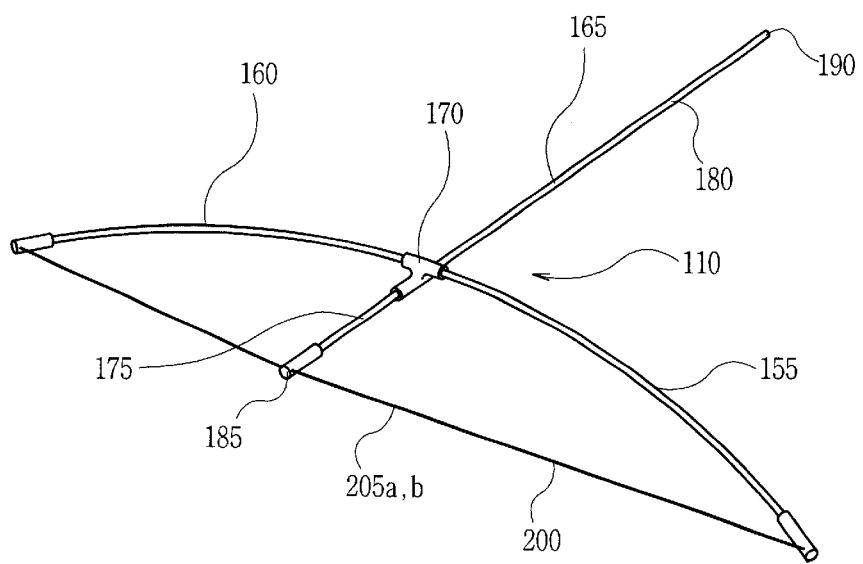
FIG. 4 is a perspective view of a main frame.

FIG. 1c and FIG. 1d illustrate a wash out condition in which the result of having loose tension on the substantially flexible surface skin 150. The trailing edge 125 is shown washed out for 5–10 degrees, reducing the lift on the airfoil structure 105. FIG. 1e and FIG. 1f illustrate a wash in condition in which the result of having loose much tension on the substantially flexible surface skin 150. The trailing edge 125 is shown washed in for 5–10 degrees, increasing the lift on the airfoil structure 105.

Figure 8:
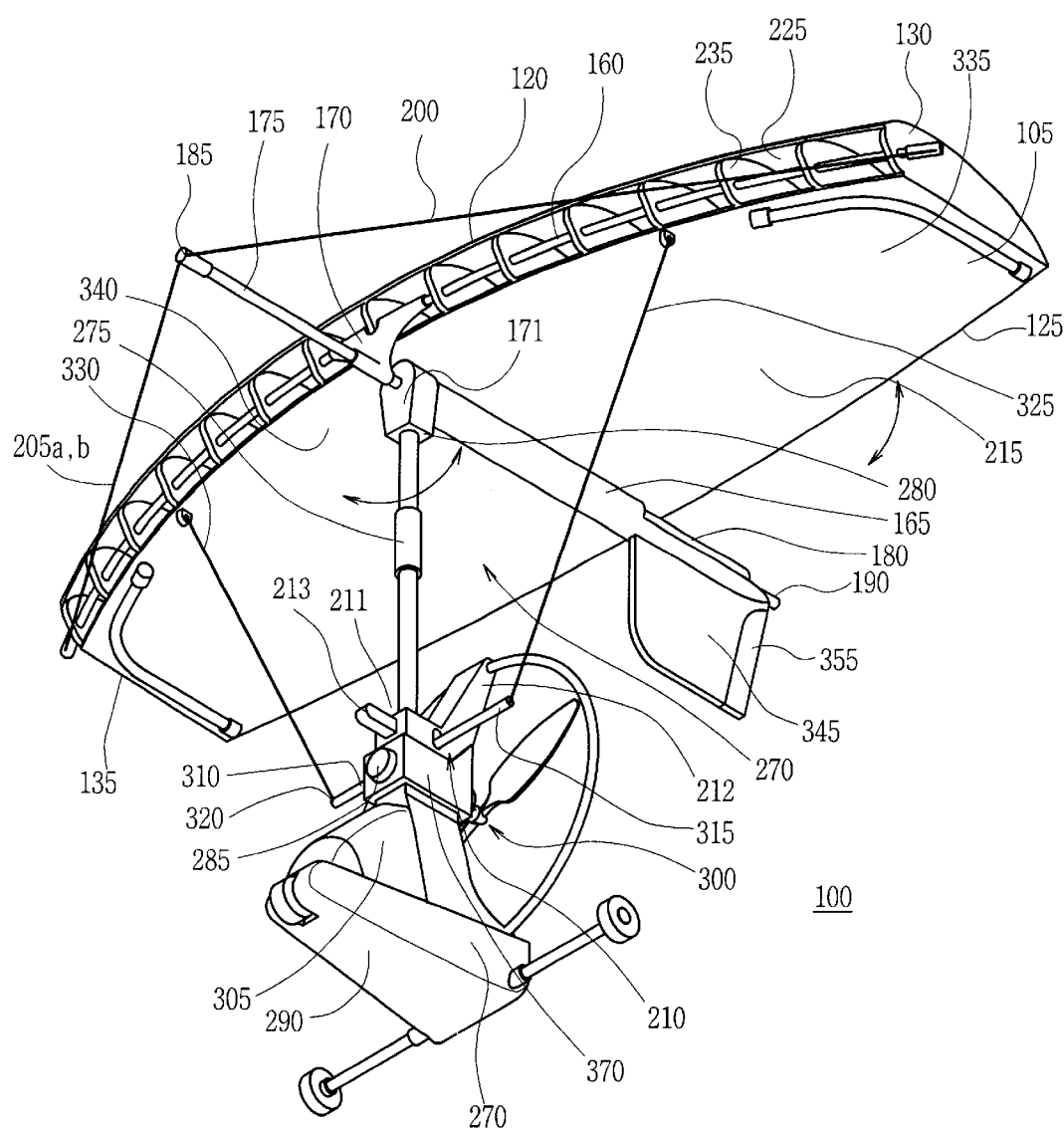
FIG. 8 is a perspective view of a variation of the present invention.

As shown in the FIG. 1 through FIG. 4, the means for providing a downward and a forward tension 115 on the leading bar 160 can be achieved by having a combination of the leading bar 160 having a downward arc 155 and a means for loading tension 200 between the forward extension 175 and the left edge 130 and between the forward extension 175 and the right edge 135. Alternately, the means for providing a downward and a forward tension 115 on the leading bar 160 can be achieved by tying a line 205a, a wire 205a, or affixing a rod 205b between about the forward tip 185 (or any portion of the forward extension 175) and the leading bar 160 on or about the left edge 130 and between about the forward tip 185 (or any portion of the forward extension 175) and the leading bar 160 on or about the right edge 135. The tying a line 205a or the use of a rod 205b between the forward tip 185 and the leading bar 160 is more effective when the forward tip 185 is bent down as shown in FIG. 1. Additionally, the means for providing a downward and a forward tension 115 on the leading bar 160 can be a combination of the forward pulling tension from the forward tip 185 and the pulling tension provided from below the airwing structure 100, as shown in FIG. 8.

The means for providing a downward and a forward tension 115 can also used to move the left edge 130 and the right edge 135 to control the lift and the movement of the airwing structure 100. For an example, if the forward tip 185 can be moved left or right by a controlling means 210 (FIG. 8), then the tension of the left edge 130 or the right edge 135 will vary, allowing the control of the airwing structure 100. Also, the control of the airwing can be easily accomplished by moving the left edge 130 and/or the right edge 135 up and down. One way to move the left edge 130 or the right edge 135 up or down is to pull down a portion of the left edge 130 or the right edge 135, or pull down a portion of the airfoil structure 105.

The preferred version of the airwing structure 100 uses a parafoil 215 as the airfoil structure 105. The parafoil 215 comprises of an air inflatable airfoil-shaped canopy 220 that has plurality of air intake openings 225 at the leading edge 120, allowing the air to inflate the airfoil-shaped canopy 220. The material used for the parafoil 215 should be flexible, such as nylon fabric. The preferred version of the inflatable airfoil-shaped canopy 220 further comprises of a plurality of air cells 230 extending from about the leading edge 120 to about the trailing edge 125. The air cells 230 comprises of ribs 235 formed of substantially airfoil shape, wherein the ribs 235 are connected between the top skin 240 and the bottom skin 245 forming the air cells 230. As a further improvement, the air cells 230 can have numerous communicating holes 250 which allow the air communication between adjacent air cells 230.

Figure 5:
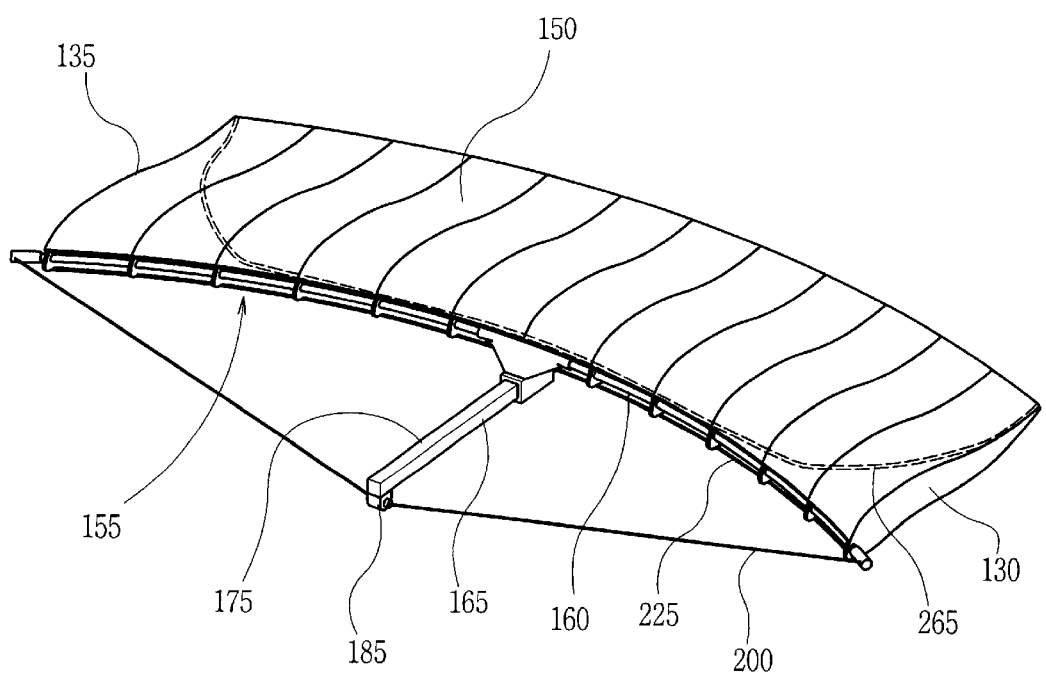
FIG. 5 is a perspective view of a variation of the present invention.

Moreover, the preferred version of the airfoil structure 105 further comprises of a left stiffening rod 255 and a right stiffening rod 260. The left stiffening rod 255 attaches to the leading edge 120 and to the left edge 130 substantially towards the trailing edge 125 and the right stiffening rod 260 attaches to the leading edge 120 and to the right edge 135 substantially towards the trailing edge 125 to tighten the trailing edge 125 and to give stiffness to the left edge 130 and the right edge 135 respectively. Alternatively, a single stiffening rod 265 can be used in lieu of the left stiffening rod 255 and the right stiffening rod 260 (as shown in FIG. 5). The stiffening rod 255, 260, 265, whether the left stiffening rod 255, the right left stiffening rod 260, or the single stiffening rod 265, should be made of flexible and elastic materials, such as flexible and elastic plastic, a coil, a bamboo strip, a wooden strip, or a spring wire.

Figure 6:
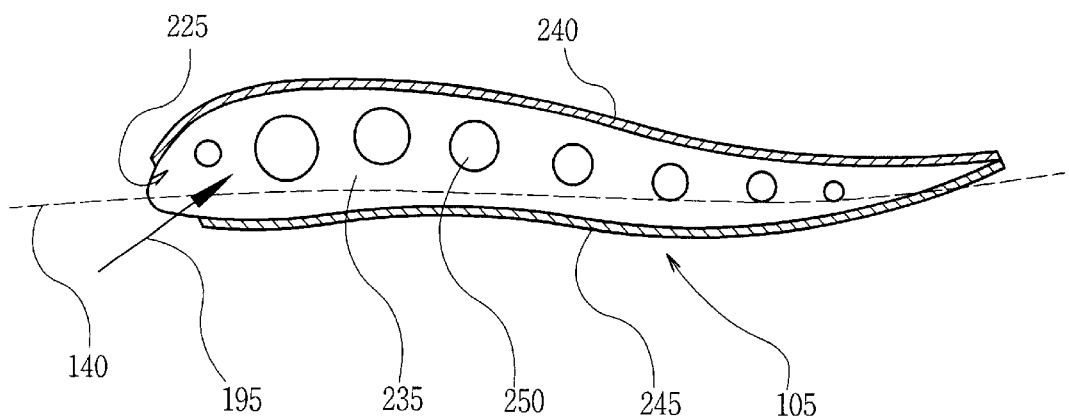
FIG. 6 is a sectional view of the parafoil in a variation of the present invention.
Figure 7:
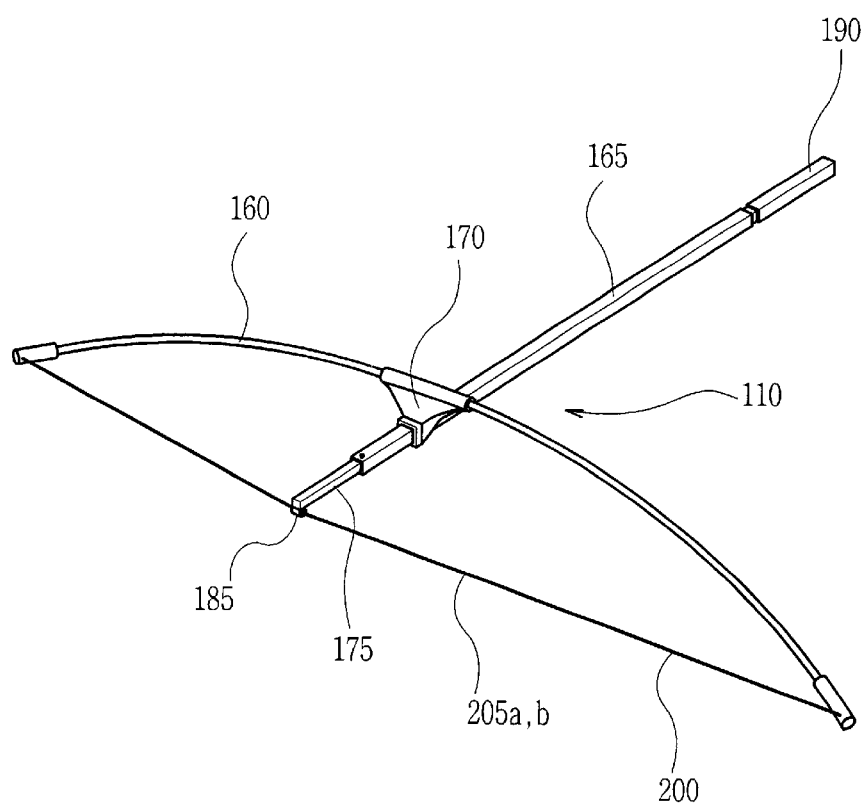
FIG. 7 is a perspective view of a main frame in a variation of the present invention.

FIG. 5 through FIG. 7 illustrate the use of expandable forward extension 175. In this configuration, the length of the forward extension 175 can be easily adjusted; thus adjusting the amount of tension applied to the leading edge 120. Also, FIG. 6 illustrates that the airfoil design is not limited to the design shown on FIG. 3.

FIG. 5, illustrates the use of the single stiffening rod 265 in lieu of the left stiffening rod 255 and the right stiffening rod 260. The middle portion of the single stiffening rod 265 is attached to the leading edge 120, but two ends of the single stiffening rod 265 elastically tighten the trailing edge 125 by giving stiffness to the left edge 130 and the right edge 135 respectively.

FIG. 8 illustrates a preferred embodiment having a load carrying means 270. The load carrying means 270 is attached to the load bearing member 275 with an upper end 280 and a low end 285. The load bearing member 275 is rotatably attached to the supporting bar 165 for better performance.

The upper end 280 is attached to the supporting bar 165 between about the junction 170 and the rear tip 190. For a better performance, the upper end 280 should be attached on or about the center of gravity of the airfoil structure 105. On the lower end 285, either a load 290 or a load carrying means 270 is attached. A load 290 can be simply a weight of a motor and the thrusting means 300, remote control mechanisms, and/or wheels.

In FIG. 8, a thrusting means 300 is attached to the load 290 or to the load carrying means 270. The load carrying means 270 can be a mere hook (not shown) or a cavity 305 designed to carry a person, articles, or various weights.

FIG. 8 also illustrates another embodiment of the controlling means 210. In this configuration, the controlling means 210 is attached on or near the load carrying means. The controlling means 210 comprises of a control arm 310 having a left tip 315 and a right tip 320, a left tension bearing member 325, and a right tension bearing member 330, whereby the left tension bearing member 325 is attached about the left tip 315 or a left wing portion 335 and the right tension bearing member 330 is attached about the right tip 320 or a right wing portion 340 so that a rotation of the control arm 310 controls the airwing structure 100 by adjusting the tension on either or both the left tension bearing member 325 and the right tension bearing member. With the use of the left tip 315 and the right tip 320, as shown in FIG. 8, remote control of the airwing structure 100 is simplified. The controlling means 210 can also be two separate remote controlled motors (not shown) that simply rotate the load bearing member 275 about the supporting bar 165.

Figure 9:
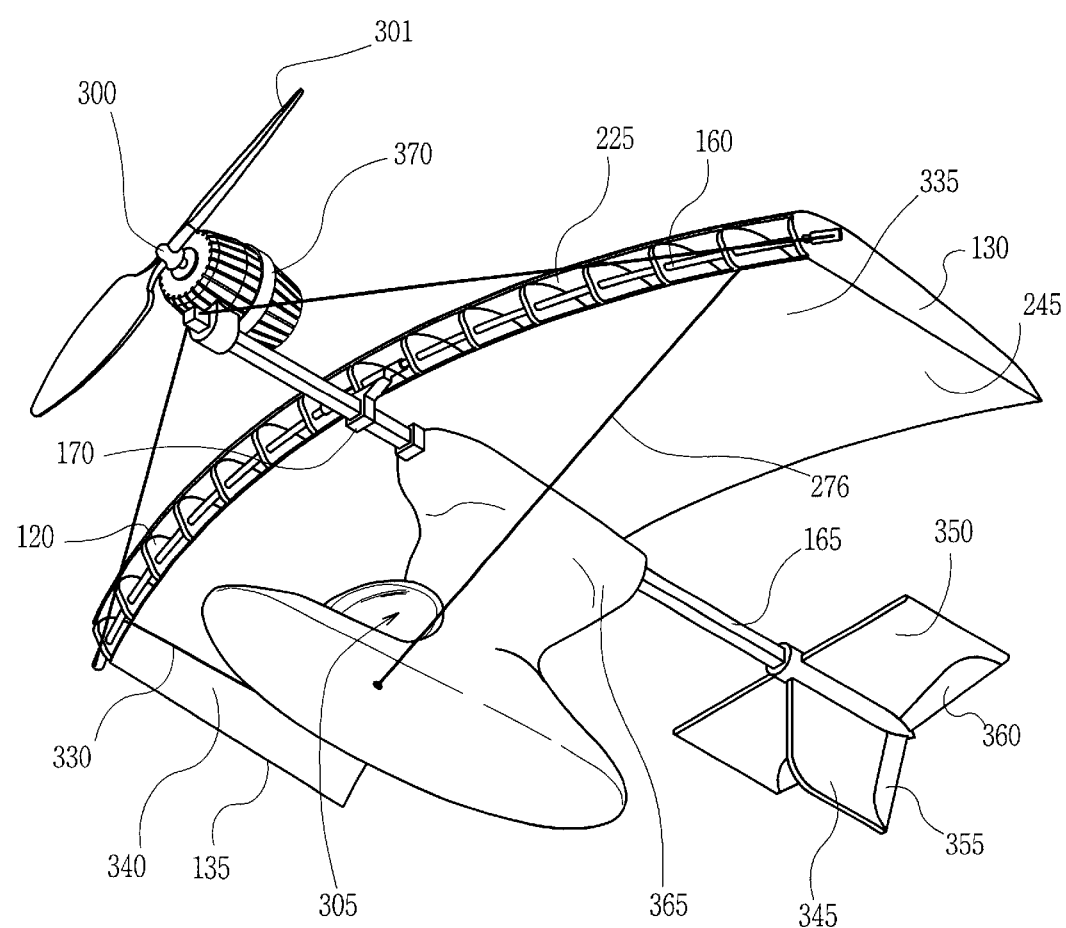
FIG. 9 is a perspective view of a variation of the present invention.

The preferred embodiment of the present invention has the controlling means 210 further comprises of the use of a universal joint 171 at the junction 170. Moreover, a means for adjusting the air wing angle 211. In FIG. 9, the adjusting means 211 comprises of an angle tension line 212 (or a rod) connected between an angle adjustment control 213 and the vertical stabilizer 345. The airwing angle can be easily adjusted by pulling on the airfoil structure 105 at about the trailing edge 125, near the rear tip 190.

FIG. 8 and FIG. 9 illustrate the supporting bar 165 having a forward extension 175 and a rear extension 180. The forward extension 175 has a forward tip 185 and the rear extension 180 has a rear tip 190. The forward tip 185 extends out beyond the leading edge 120 opposite from the rear extension 180 and the rear tip 190 extends out beyond the trailing edge 125 opposite from the forward extension 175. On the rear extension 180, near the rear tip 190, a vertical stabilizer 345 is attached. Moreover, a rear wing 350 is attached to the vertical stabilizer 345 about perpendicular to it. A rudder 355 is attached to the vertical stabilizer 345 and an elevator 360 is attached to the rear wing. In this configuration, the controlling means 210 can simply be the conventional means to control the rudder 355 and the elevators 360.

FIG. 9 shows another embodiment in which the supporting bar 165 is a part of a fuselage 365. In fact, the load bearing member 275 and the load carrying means 270 are also a part of the fuselage 365. Also, in this configuration, because the load carrying means 270 is substantially below the airfoil structure 105, a set of lift bracing wires 276 is used to stabilize the airwing structure 100. In configuration such as these, the vertical stabilizer 345 and the rear wing 350, with their rudder 355 and the elevators 360, are used to control and to maneuver the airwing structure 100.

FIG. 9 also illustrates the use of a thrusting means 300 attached to the airwing structure 100. Generally a thrusting means 300 is an engine with a propeller 301, but also include any conventional thrusting means 300, such as combustion, jet or rocket. The preferred version of the engine is an electrical. Because the present invention requires substantially less energy than prior art inventions, a small battery or even a capacitor can be used as a fuel source 370. The thrusting means 300 can be attached to any part of the airwing structure 100, including and not limited to the forward tip 185 of the forward extension 175, the rear tip 190 of the rear extension 180, the front of the load 290, the rear of the load 290, the front of the load carrying means 270, and the rear of the load carrying means 270. Also, a plurality of thrusting means 300 can be attached to the supporting bar 165 or to the leading bar 160.

Figure 10:
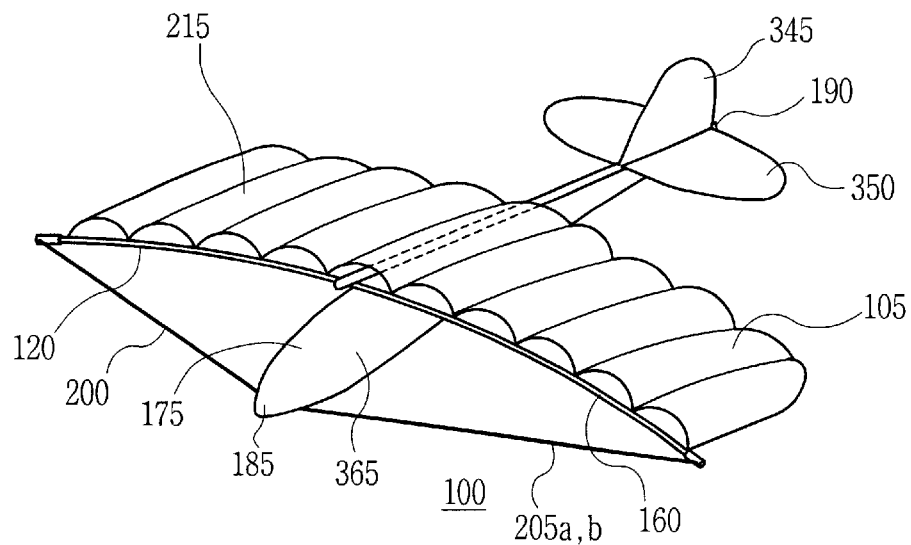
FIG. 10 is a perspective view of a variation of the present invention.
Figure 11:
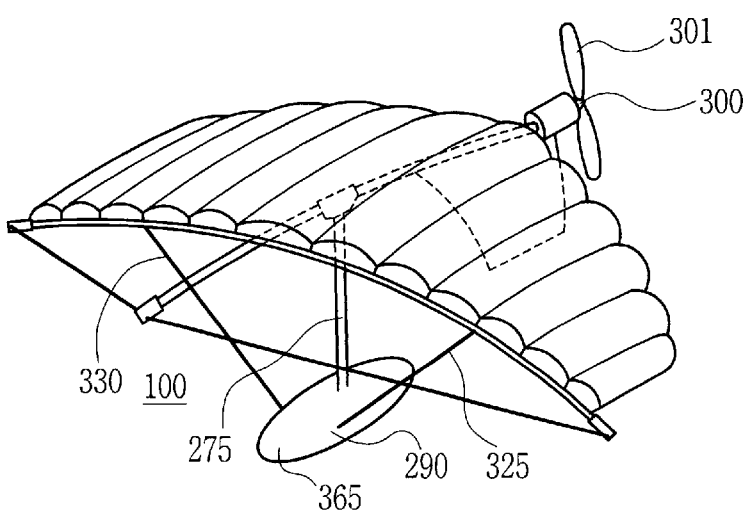
FIG. 11 is a perspective view of a variation of the present invention.
Figure 12:
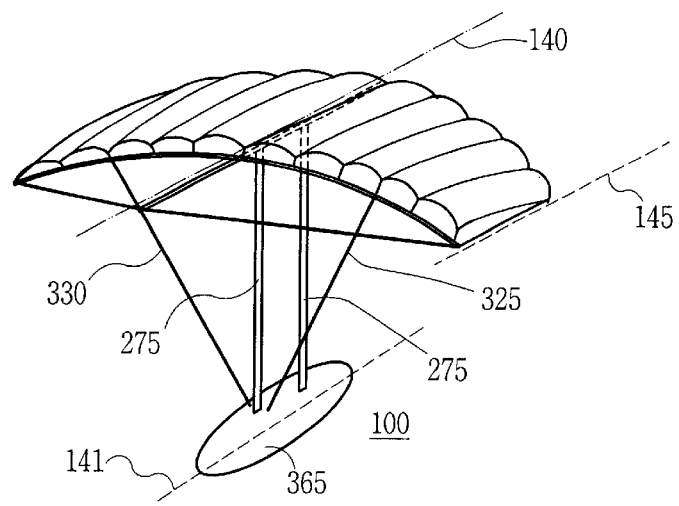
FIG. 12 is a perspective view of a variation of the present invention.

FIG. 10 is a perspective view of a variation of the present invention using the fuselage 365 as the supporting bar 165. FIG. 11 is a perspective view of a variation of the present invention having the thrusting means 300 attached to the rear tip 190. FIG. 12 is a perspective view of a variation of the present invention having more than one load bearing member 275.

Figure 13:
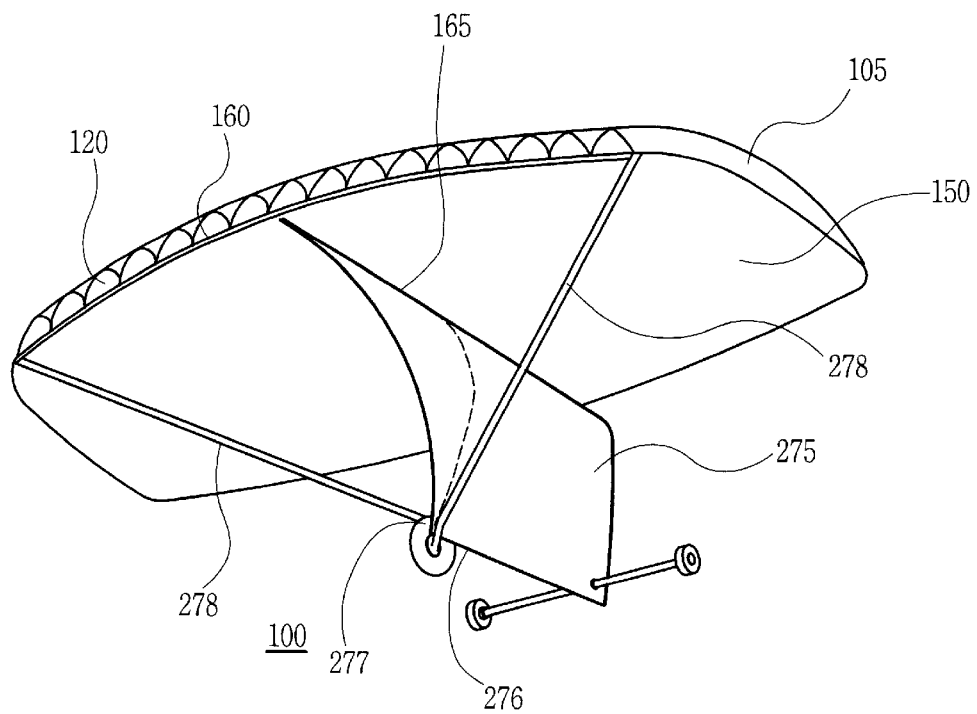
FIG. 13 is a perspective view of a variation of the present invention.

FIG. 13 is a perspective view of a variation of the present invention having an elongated load bearing member 275. The elongated load bearing member 275 is substantially shorter than the length of the support bar 165 so that a lower elongated side 276 is between the junction 170 and the rear tip 190. The front section 277 of the lower elongated side 276 securely fixes the thrust beams 278, applying the forward tension on to the leading edge 120 and the leading bar 160. As shown in the figure, the thrust beams 278 push on the leading bar 160 substantially about the left edge and substantially about the right edge of the airfoil structure 105 to tighten the substantially flexible surface skin 150.

Figure 14:
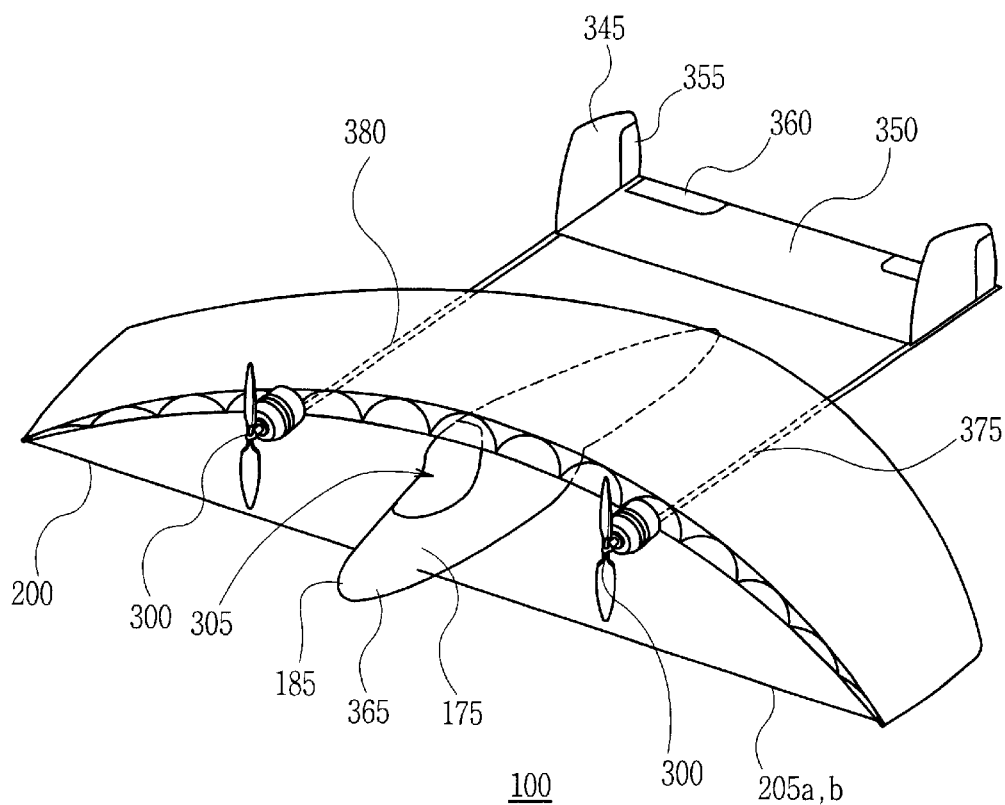
FIG. 14 is a perspective view of a variation of the present invention.

FIG. 14 is a perspective view of a variation of the present invention having, in addition to the supporting bar 165, a secondary bar 375 attached to the leading bar 160 and attached to about the trailing edge 125 supporting, a tertiary bar 380 attached to the leading bar 160 and attached to about the trailing edge 125. FIG. 14 also illustrates having two thrusting means 300 attached to the leading bar 160.

Figure 15:
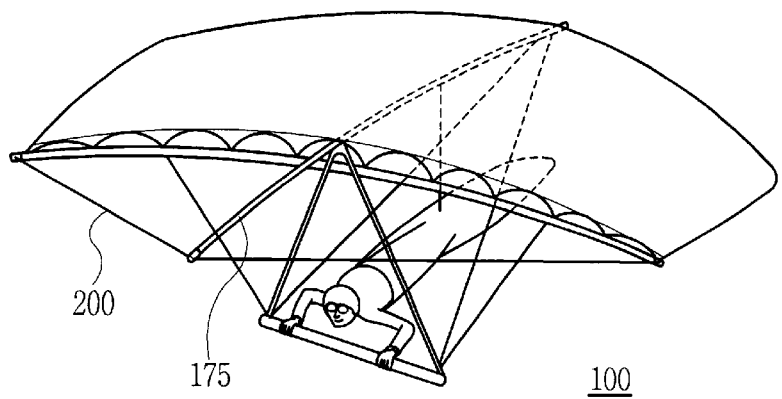
FIG. 15 is a perspective view of a variation of the present invention.

FIG. 15 is a perspective view of a variation of the present invention.

Figure 16:
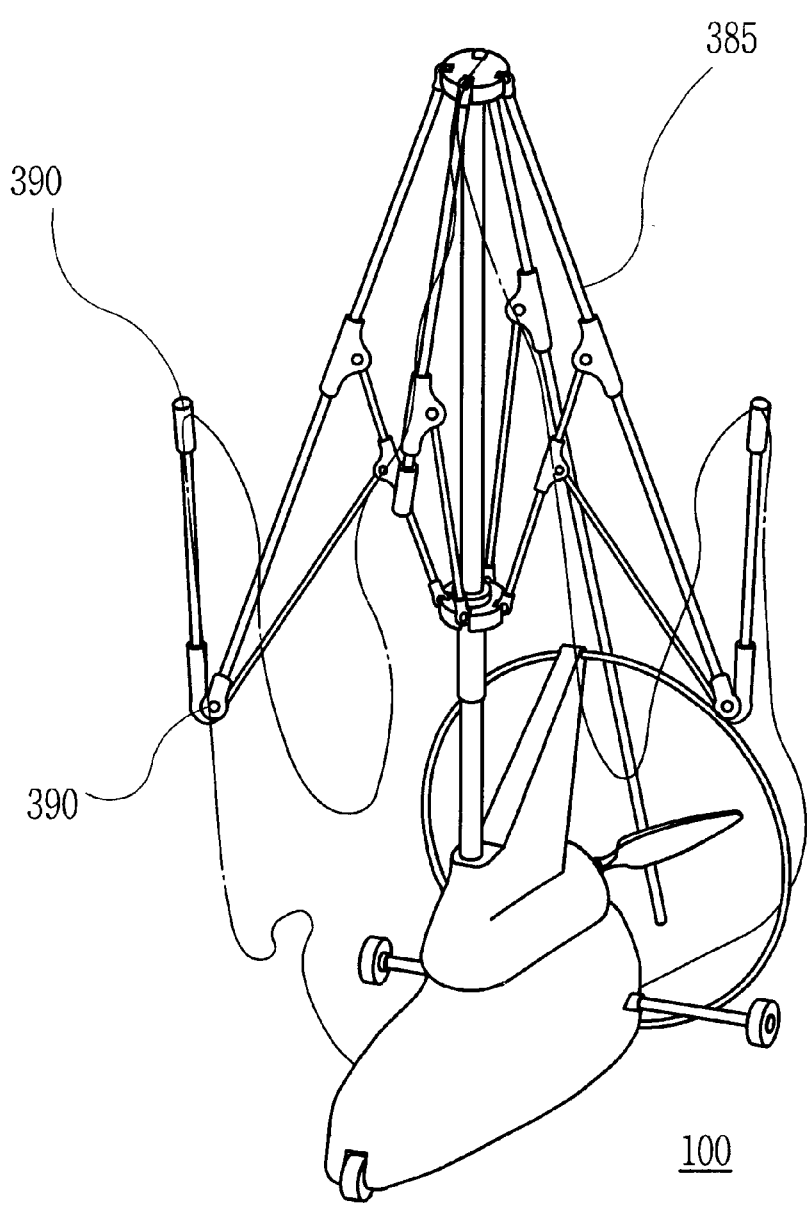
FIG. 16 is a perspective view of a variation of the present invention.
Figure 17:
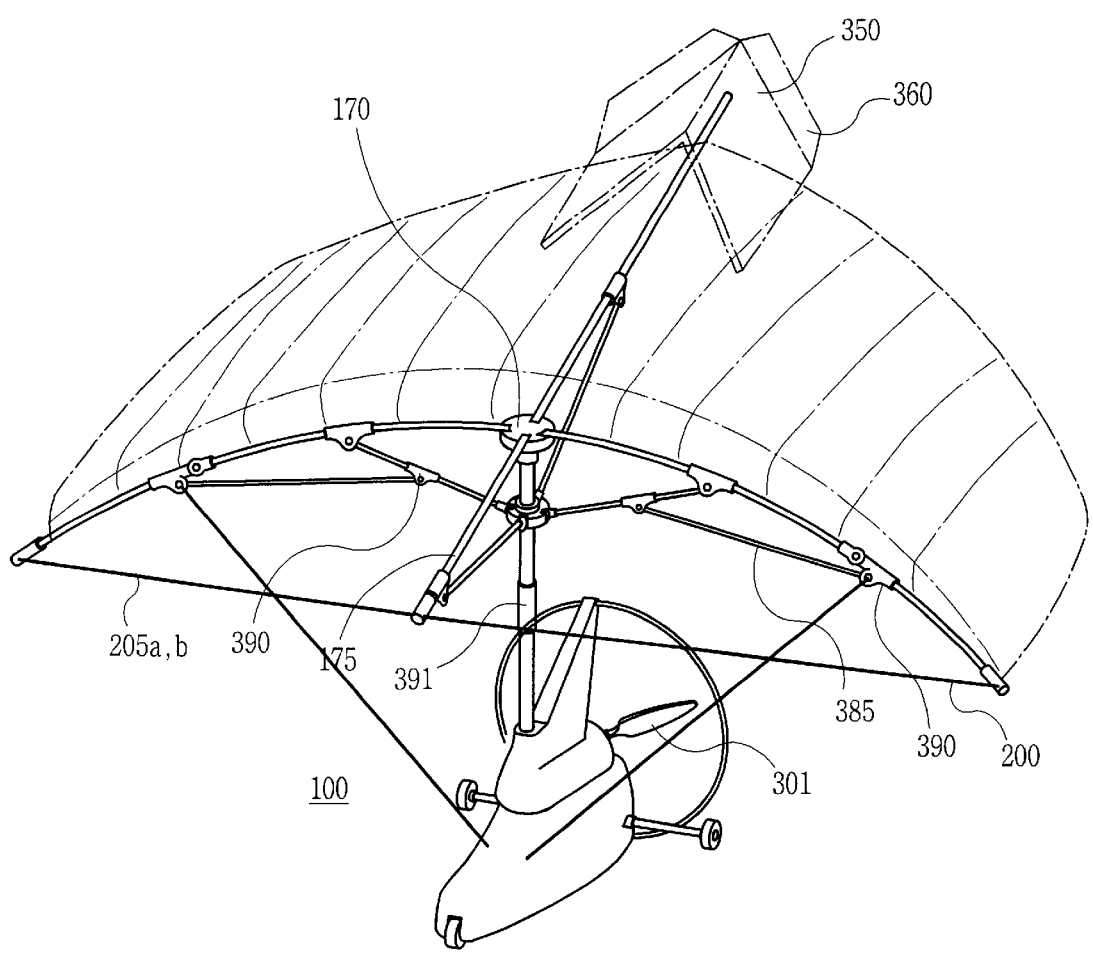
FIG. 17 is a perspective view of a variation of the present invention showing the collapsed airwing structure.

FIG. 16 is a perspective view of a variation of the present invention showing the collapsed airwing structure 100, wherein the leading bar 160 is design to be folded for easy storage and transportation. FIG. 17 is a perspective view of a variation of the present invention showing the collapsible frames 385 extended. The most preferred means for folding the leading bar 160 is the use of folding joints 390 similar to those of a conventional umbrella, and the most preferred means for folding the load bearing member 275 is the telescoping poles 391.

Figure 18:
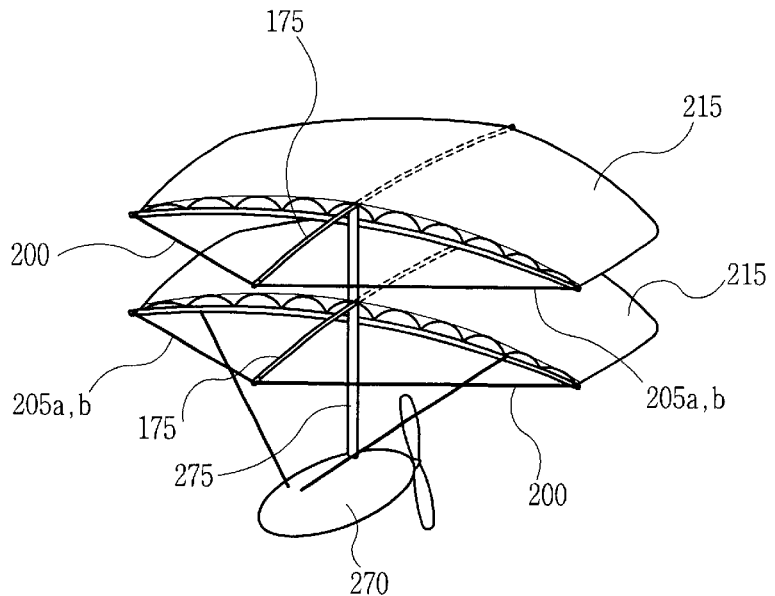
FIG. 18 is a perspective view of a variation of the present invention showing the collapsible frames extended.
Figure 19:
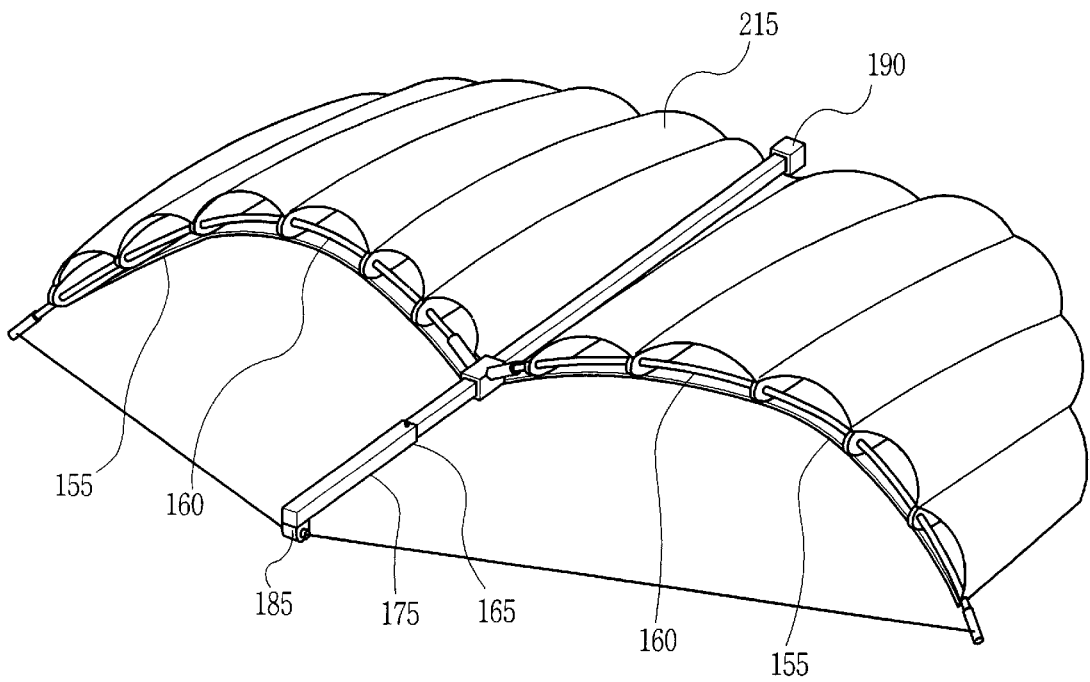
FIG. 19 is a perspective view of a variation of the present invention.

FIG. 18 is a perspective view of a variation of the present invention having two airfoils. FIG. 19 is a perspective view of a variation of the present invention having two arcs on the leading bar 160.

Figure 20:
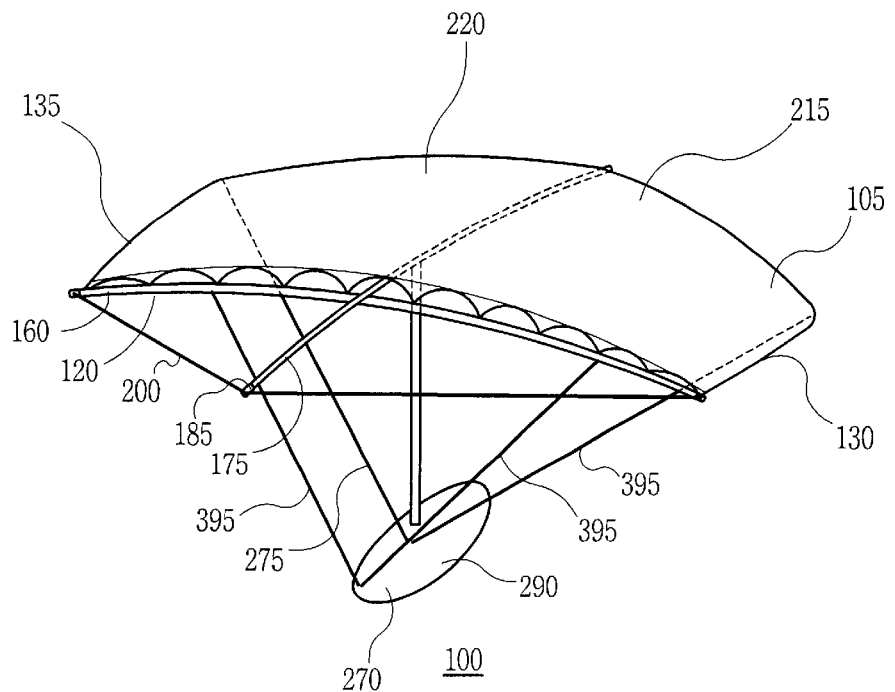
FIG. 20 is a perspective view of a variation of the present invention.

FIG. 20 is a perspective view of a variation of the present invention using a pair of aileron control lines 395. The pair of aileron control lines 395 can additionally control the wash in and/or wash out angle of the left edge 130 and the right edge 135 of the airfoil structure 105. Two upper ends of the two aileron control lines 395 are connected to the leading bar 160 or about the leading edge 120, substantially about the left edge 130 and the right edge 135 respectively. Likewise, two upper ends of the two aileron control lines 395 are connected to the trailing edge 125, substantially about the left edge 130 and the right edge 135 respectively. The lower ends of the aileron control lines 395 are attached to the load 290 or the load carrying means 270.

Figure 21:
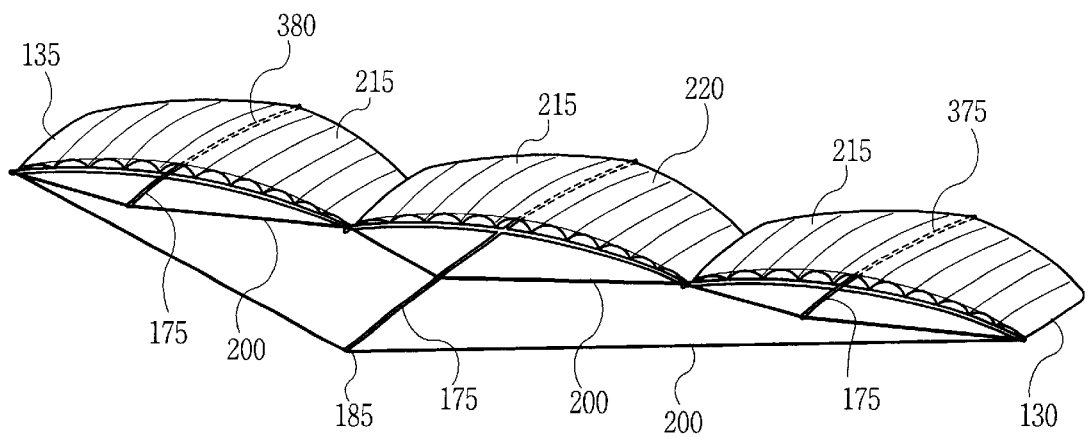
FIG. 21 is a perspective view of a variation of the present invention.

FIG. 21 is a perspective view of a variation of the present invention having three arcs on the leading bar 160. Each arc section of the leading bar 160 has its corresponding forward extension 175 to independently provide downward and forward tension on the individual arc section. This variation is used to make the airwing structure 100 large, by joining a several smaller airwing structure 100s.

Figure 22:
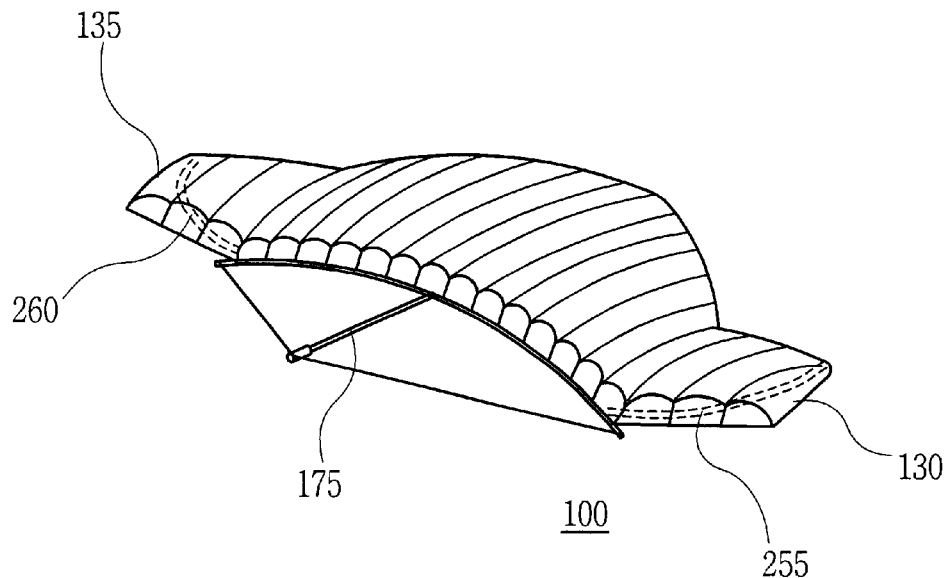
FIG. 22 is a perspective view of a variation of the present invention.
Figure 23:
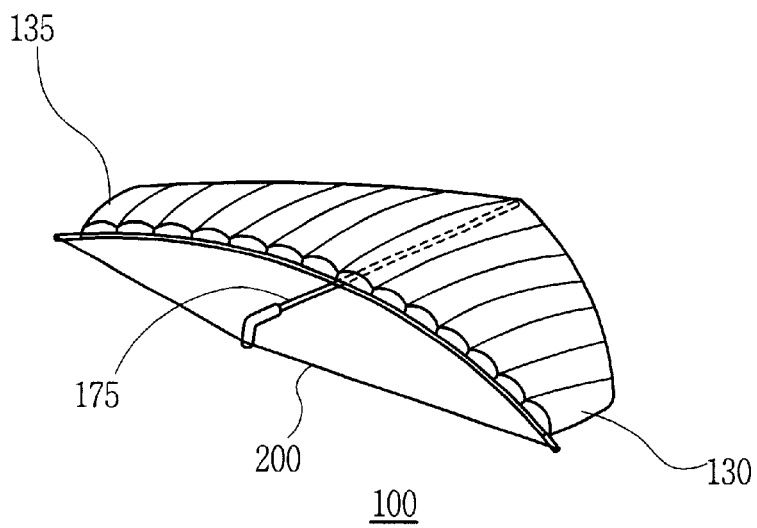
FIG. 23 is a perspective view of a variation of the present invention.
Figure 24:
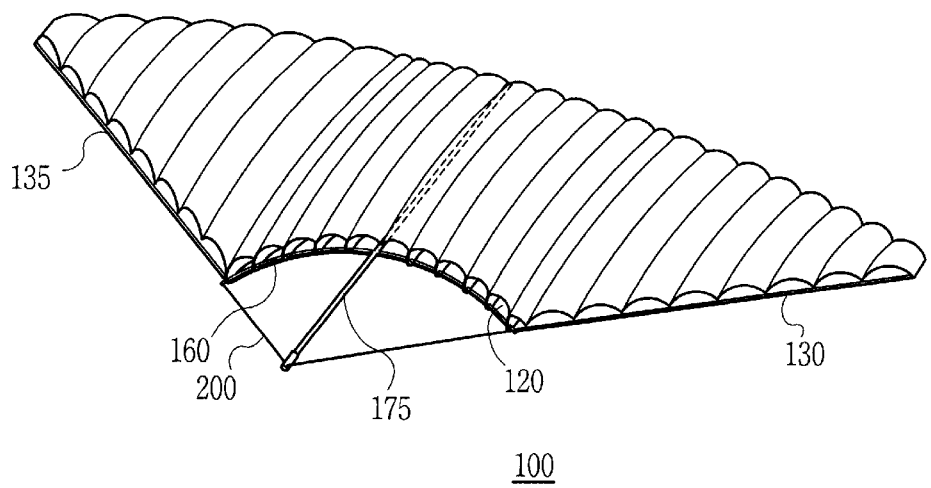
FIG. 24 is a perspective view of a variation of the present invention.
Figure 25:
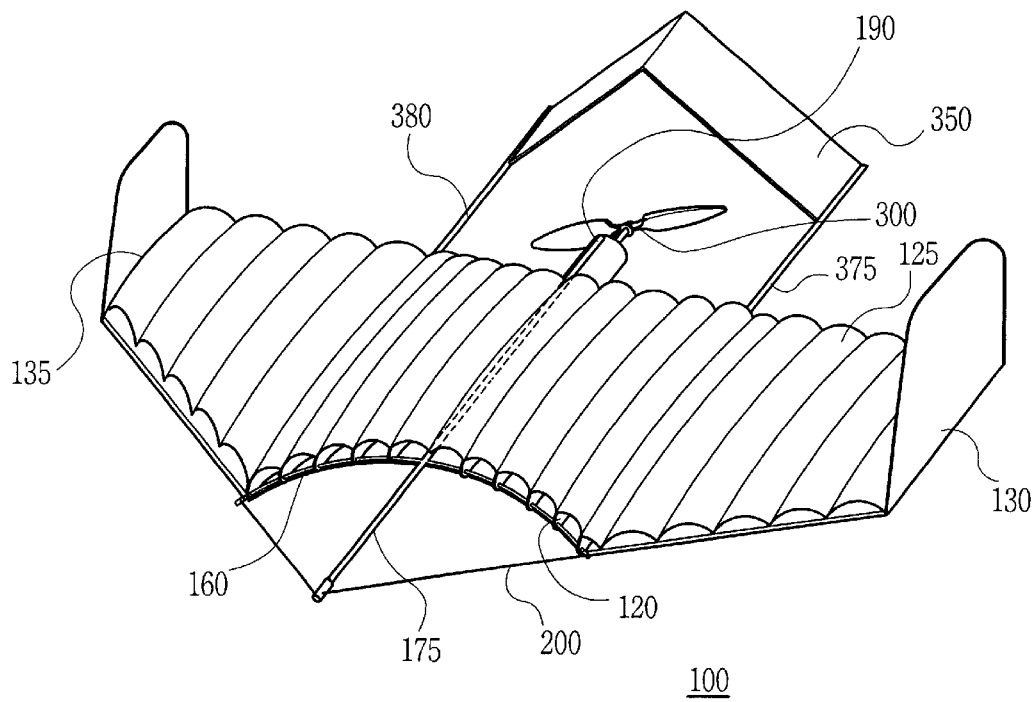
FIG. 25 is a perspective view of a variation of the present invention.
Figure 26:
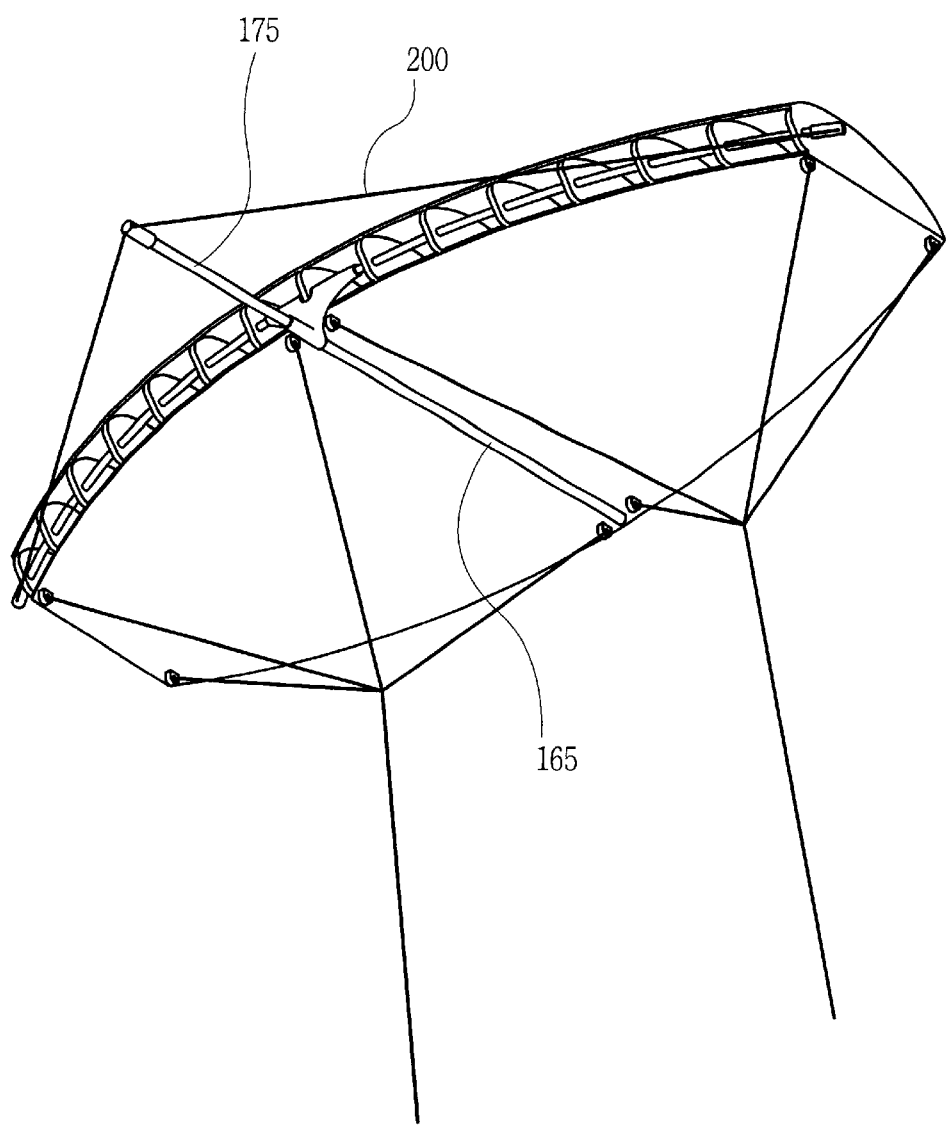
FIG. 26 is a perspective view of a variation of the present invention.
Figure 27:
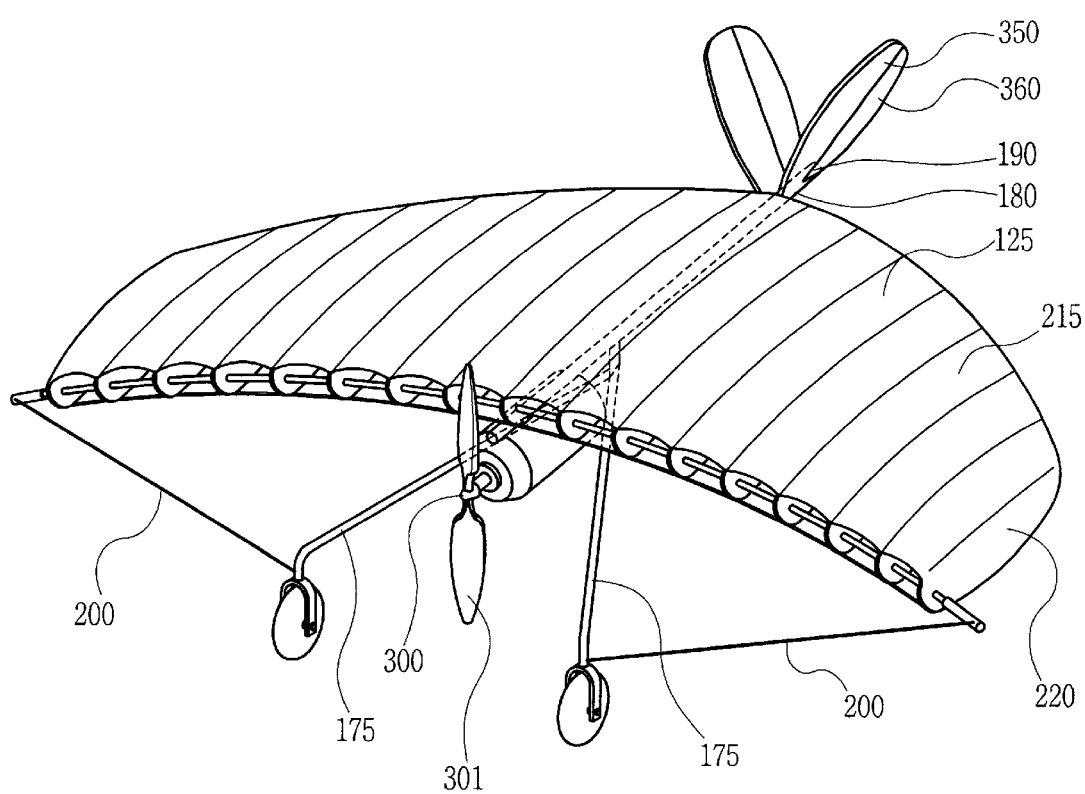
FIG. 27 is a perspective view of a variation of the present invention.
Figure 28:
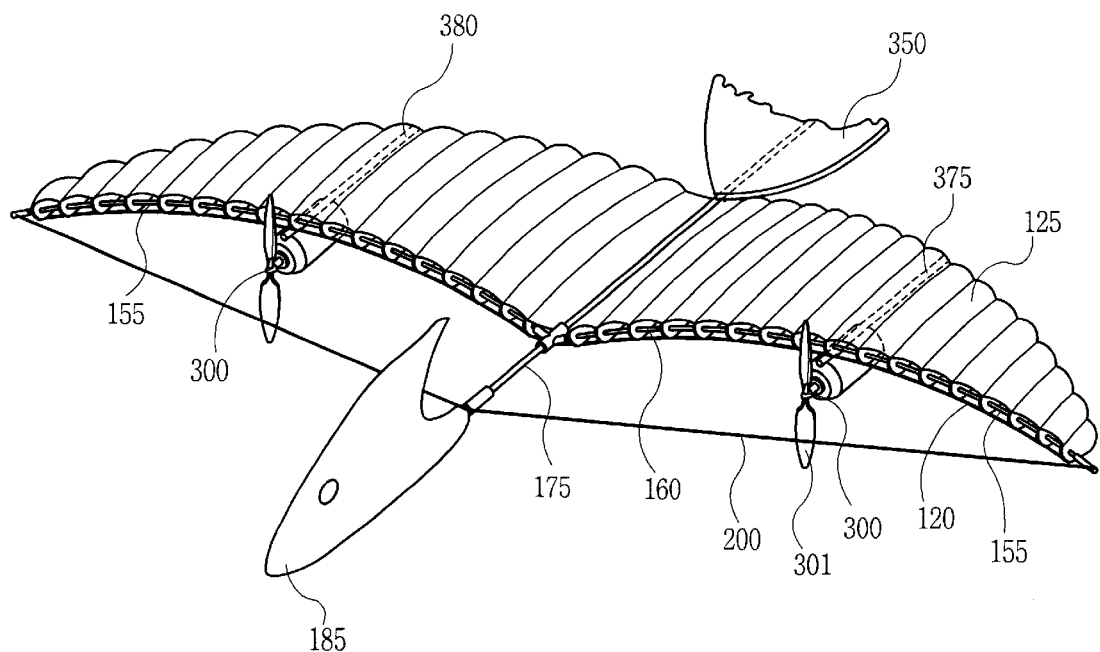
FIG. 28 is a perspective view of a variation of the present invention.
Figure 29:
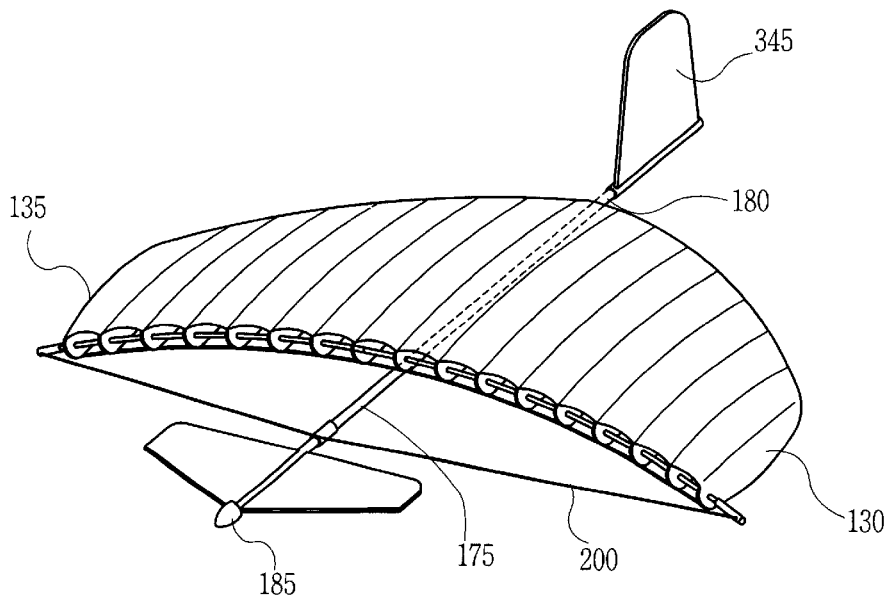
FIG. 29 is a perspective view of a variation of the present invention.
Figure 30:
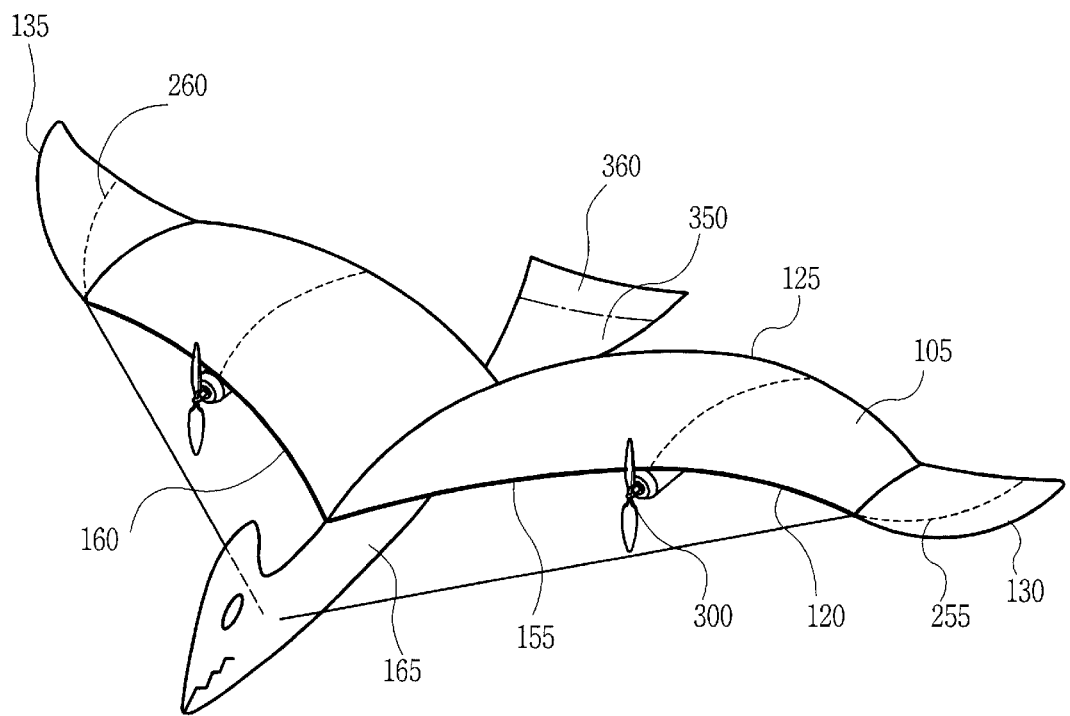
FIG. 30 is a perspective view of a variation of the present invention.
Figure 31:
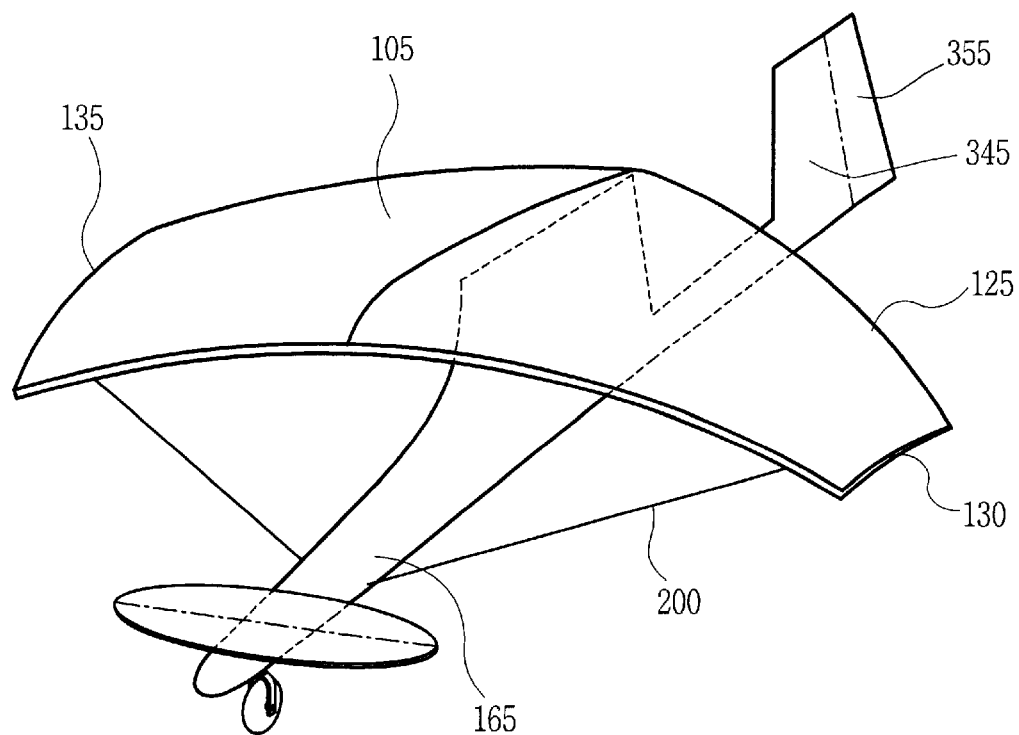
FIG. 31 is a perspective view of a variation of the present invention.

FIG. 22 is a perspective view of a variation of the present invention in which the leading bar 160 does not fully extend over the leading edge 120.

FIG. 23 through FIG. 31 are various variations of the present invention.

Based on the disclosure of this application and the empirical data, an advantage of the present invention are numerous. The present invention provides an airwing structure 100 for aircrafts or similar flying objects which are easy to control and operate. Moreover, the present invention provides an airwing structure 100 that minimizes the supporting frames and/or loading and suspension lines to reduce the weight and the manufacturing cost of the airwing structure 100.

Another advantage of the present invention is that it provides an airwing structure 100, comprising of a ram air inflatable airfoil canopy and an airwing frame supporting the airfoil canopy to form an airwing for carrying a vehicle body, that can be powered by a relatively small engine of small output, whether gasoline or electrical. Additionally, because of low energy requirement due to the efficiency of the airwing structure 100, the present invention can support a pilot in air, wherein the pilot can operate the airwing to regulate the climb, descent, airborne steering, and level flight without the need of gasoline or electrical power.

Another advantage is a quiet and nearly silent operation of the airwing structure 100 through its remarkable efficiency. Additionally, due to its quietness and low power requirement, a quiet surveillance over an area over a long period of time can be achieved. Moreover, because of its stability, very good quality pictures can be taken even with a longer frame speed or with a higher resolution.

Another advantage of the present invention is that it is easy to launch, take off, and control during the flight, while providing a substantial safety. Moreover, because the skin of the airwing structure 100 is soft, there are hardly any breakables, allowing for a very durable toy and industry use.

Another advantage of the present invention that the airwing structure 100 is able to have a vehicle body adapted to suspend below the airwing for a distance equal to or less than half the length of the airwing. Moreover, with the present invention, one can combine the usefulness of the rear wing, the rudders, and the stabilizers to the airwing structure 100.

Another advantage of the present invention is that it is easily controlled using a remote control, while the cost of the airwing structure 100 remains very low for various toy applications. Moreover, the simulation of the flying creatures, such as birds and pterodactyls, are more real and they can easily be controlled remotely. Furthermore, the present invention also provides for the collapse the airwing structure 100 for easy storage and transportation.

Although the invention has been described in considerable detail with reference to certain preferred versions thereof, other versions are possible. Therefore the spirit of the invention should not be limited to the description herein, and the claims should be read broadly.

What I claim is:

1. An airwing structure comprising:
   a. an airfoil structure having a downward arc for producing lift by aerodynamic forces exerted thereon, wherein the airfoil structure has a leading edge, a trailing edge, a left edge, a right edge, a central wing root, a thrust line, and a plurality of chord lines, and wherein the airfoil structure comprises of a substantially flexible surface skin;
   b. a main frame attached to the airfoil structure comprising a leading bar and a supporting bar, wherein the leading bar is fixedly attached to about the leading edge supporting and maintaining the leading edge from collapsing, and wherein the supporting bar is attached to the leading bar and attached to about the trailing edge supporting and maintaining the airfoil structure from collapsing; and
   c. a means for providing a downward and a forward tension on the leading bar substantially about the left edge and substantially about the right edge of the airfoil structure to tighten the substantially flexible surface skin so the chord lines of a substantial portion of the airfoil structure are aligned with the central wing root and the thrust line to have the same angle of attack during the flight condition.

2. The airwing structure of claim 1 wherein the means for providing a downward and a forward tension is also used to move the left edge and the right edge to control the lift and the movement of the airwing structure.

3. The airwing structure of claim 2 wherein the airfoil is a parafoil comprising of an air inflatable airfoil-shaped canopy, wherein the leading edge has an air intake opening allowing the air to inflate the airfoil-shaped canopy.

4. The airwing structure of claim 3 wherein the airfoil structure further comprises of a left stiffening rod and a right stiffening rod, the left stiffening rod attached to the leading edge and to the left edge substantially towards the trailing edge and the right stiffening rod attached to the leading edge and to the right edge substantially towards the trailing edge, wherein the left stiffening rod and the right stiffening rod tightens the trailing edge and gives stiffness to the left edge and the right edge respectively.

5. The airwing structure of claim 3 wherein the airfoil structure further comprises of a single stiffening rod having a left stiffening section and a right stiffening section, the single stiffening rod attached to the leading edge and the left stiffening section is attached to the left edge substantially towards the trailing edge while the right stiffening section is attached to the right edge substantially towards the trailing edge, wherein the left stiffening section and the right stiffening section tighten the trailing edge and give stiffness to the left edge and the right edge respectively.

6. The airwing structure of claim 4 wherein the inflatable airfoil-shaped canopy further comprises of a top skin, a bottom skin, and a plurality of air cells extending from about the leading edge to about the trailing edge, wherein the air cells comprises of ribs formed of substantially airfoil shape, and wherein the ribs are connected between the top skin and the bottom skin forming the air cells.

7. The airwing structure of claim 5 wherein the ribs of the air cells have one or more communicating holes wherein the communicating holes allow the air communication between two adjacent air cells.

8. The airwing structure of claim 7 wherein the leading bar is foldable to fold the airwing structure.

9. The airwing structure of claim 7 wherein the supporting bar is a fuselage.

10. An airwing structure comprising:
  a. an airfoil structure having a downward arc for producing lift by aerodynamic forces exerted thereon, wherein the airfoil structure has a leading edge, a trailing edge, a left edge, a right edge, a central wing root, a thrust line, and a plurality of chord lines, and wherein the airfoil structure comprises of a substantially flexible surface skin;
  b. a main frame attached to the airfoil structure comprising a leading bar and a supporting bar joined together forming a junction, the supporting bar having a forward extension and a rear extension, the forward extension having a forward tip and the rear extension having a rear tip, wherein the forward extension extends beyond the leading edge opposite from the rear extension, wherein the leading bar is fixedly attached to about the leading edge supporting and maintaining the leading edge from collapsing, and wherein the rear extension is attached to about the trailing edge supporting and maintaining the airfoil structure from collapsing; and
  c. a means for providing a downward and a forward tension on the leading bar substantially about the left edge and substantially about the right edge of the airfoil structure to tighten the substantially flexible surface skin so the chord lines of a substantial portion of the airfoil structure are aligned with the central wing root and the thrust line to have the same angle of attack during the flight condition.

11. The airwing structure of claim 10 wherein the means for providing a downward and a forward tension is a combination of the leading bar having a downward arc and a means for loading tension between the forward extension and the left edge and between the forward extension and the right edge.

12. The airwing structure of claim 11 wherein the means for providing a downward and a forward tension is also used to move the left edge and the right edge to control the lift and the movement of the airwing structure.

13. The airwing structure of claim 12 wherein the airfoil structure further comprises of a left stiffening rod and a right stiffening rod, the left stiffening rod attached to the leading edge and to the left edge substantially towards the trailing edge and the right stiffening rod attached to the leading edge and to the right edge substantially towards the trailing edge, wherein the left stiffening rod and the right stiffening rod tightens the trailing edge and gives stiffness to the left edge and the right edge respectively.

14. The airwing structure of claim 12 wherein the airfoil structure further comprises of a single stiffening rod having a left stiffening section and a right stiffening section, the single stiffening rod attached to the leading edge and the left stiffening section is attached to the left edge substantially towards the trailing edge while the right stiffening section is attached to the right edge substantially towards the trailing edge, wherein the left stiffening section and the right stiffening section tighten the trailing edge and give stiffness to the left edge and the right edge respectively.

15. The airwing structure of claim 13 further comprising a means for thrusting the airwing structure.

16. The airwing structure of claim 15 wherein the thrusting means is attached to the forward tip of the forward extension.

17. The airwing structure of claim 15 wherein the thrusting means is attached to the rear tip of the rear extension.

18. The airwing structure of claim 15 further comprising a load bearing member having an upper end and a lower end, wherein the load bearing member is attached to the supporting bar by the upper end.

19. The airwing structure of claim 18 wherein the load bearing member is attached to the supporting bar between about the junction and the rear tip.

20. The airwing structure of claim 19 wherein the load bearing member is attached to the supporting bar about the center of gravity for the airfoil.

21. The airwing structure of claim 20 further comprises of a load attached to about the lower end, wherein the thrusting means is attached to the load.

22. The airwing structure of claim 20 further comprises of a means for carrying a load attached to about the lower end, wherein the thrusting means is attached to the load carrying means.

23. The airwing structure of claim 22 wherein the leading bar is foldable to fold the airwing structure.

24. The airwing structure of claim 22 wherein the supporting bar is a fuselage.

25. The airwing structure of claim 11 wherein the airfoil is a parafoil comprising of an air inflatable airfoil-shaped canopy, wherein the leading edge has an air intake opening allowing the air to inflate the airfoil-shaped canopy.

26. The airwing structure of claim 25 wherein the inflatable airfoil-shaped canopy further comprises of a top skin, a bottom skin, and a plurality of air cells extending from about the leading edge to about the trailing edge, wherein the air cells comprises of ribs formed of substantially airfoil shape, and wherein the ribs are connected between the top skin and the bottom skin forming the air cells.

27. The airwing structure of claim 26 wherein the means for providing a downward and a forward tension is also used to move the left edge and the right edge to control the lift and the movement of the airwing structure.

28. The airwing structure of claim 27 further comprising a means for thrusting the airwing structure.

29. The airwing structure of claim 28 wherein the thrusting means is attached to the forward tip of the forward extension.

30. The airwing structure of claim 28 wherein the thrusting means is attached to the rear tip of the rear extension.

31. The airwing structure of claim 28 further comprising a load bearing member having an upper end and a lower end, wherein the load bearing member is attached to the supporting bar by the upper end.

32. The airwing structure of claim 31 wherein the load bearing member is attached to the supporting bar between about the junction and the rear tip.

33. The airwing structure of claim 32 wherein the load bearing member is attached to the supporting bar about the center of gravity for the airfoil.

34. The airwing structure of claim 33 further comprises of a load attached to about the lower end, wherein the thrusting means is attached to the load.

35. The airwing structure of claim 33 further comprises of a means for carrying a load attached to about the lower end, wherein the thrusting means is attached to the load carrying means.

36. The airwing structure of claim 35 wherein the leading bar is foldable to fold the airwing structure.

37. The airwing structure of claim 35 wherein the supporting bar is a fuselage.

38. An airwing structure comprising:
a. an airfoil structure having a downward arc for producing lift by aerodynamic forces exerted thereon, wherein the airfoil structure has a leading edge, a trailing edge, a left edge, a right edge, a central wing root, a thrust line, and a plurality of chord lines, and wherein the airfoil structure comprises of a substantially flexible surface skin;
b. a main frame attached to the airfoil structure comprising a leading bar and a supporting bar joined together forming a junction, the supporting bar having a forward extension and a rear extension, the forward extension having a forward tip and the rear extension having a rear tip, wherein the forward tip extends out beyond the leading edge opposite from the rear extension and the rear tip extends out beyond the trailing edge opposite from the forward extension, wherein the leading bar is fixedly attached to about the leading edge supporting and maintaining the leading edge from collapsing, and wherein the rear extension is attached to about the trailing edge supporting and maintaining the airfoil structure from collapsing; and
c. a means for providing a downward and a forward tension on the leading bar substantially about the left edge and substantially about the right edge of the airfoil structure to tighten the substantially flexible surface skin so the chord lines of a substantial portion of the airfoil structure are aligned with the central wing root and the thrust line to have the same angle of attack during the flight condition.

39. The airwing structure of claim 38 wherein the airfoil structure further comprises of a left stiffening rod and a right stiffening rod, the left stiffening rod attached to the leading edge and to the left edge substantially towards the trailing edge and the right stiffening rod attached to the leading edge and to the right edge substantially towards the trailing edge, wherein the left stiffening rod and the right stiffening rod tightens the trailing edge and gives stiffness to the left edge and the right edge respectively.

40. The airwing structure of claim 38 wherein the airfoil structure further comprises of a single stiffening rod having a left stiffening section and a right stiffening section, the single stiffening rod attached to the leading edge and the left stiffening section is attached to the left edge substantially towards the trailing edge while the right stiffening section is attached to the right edge substantially towards the trailing edge, wherein the left stiffening section and the right stiffening section tighten the trailing edge and give stiffness to the left edge and the right edge respectively.

41. The airwing structure of claim 39 further comprises of a vertical stabilizer attached to the rear extension about the rear tip.

42. The airwing structure of claim 41 further comprises of a rear wing attached to the rear extension about the rear tip, and about perpendicular to the vertical stabilizer.

43. The airwing structure of claim 42 wherein the means for providing a downward and a forward tension is a combination of the leading bar having a downward arc and a means for loading tension between the forward extension and the left edge and between the forward extension and the right edge.

44. The airwing structure of claim 43 wherein the means for providing a downward and a forward tension is also used to move the left edge and the right edge to control the lift and the movement of the airwing structure.

45. The airwing structure of claim 44 further comprising a means for thrusting the airwing structure.

46. The airwing structure of claim 45 wherein the thrusting means is attached to the forward tip of the forward extension.

47. The airwing structure of claim 45 further comprising a load bearing member having an upper end and a lower end, wherein the load bearing member is attached to the supporting bar by the upper end.

48. The airwing structure of claim 47 wherein the load bearing member is attached to the supporting bar between about the junction and the rear tip.

49. The airwing structure of claim 48 wherein the load bearing member is attached to the supporting bar about the center of gravity for the airfoil.

50. The airwing structure of claim 49 further comprises of a load attached to about the lower end, wherein the thrusting means is attached to the load.

51. The airwing structure of claim 50 further comprises of a means for carrying a load attached to about the lower end, wherein the thrusting means is attached to the load carrying means.

52. The airwing structure of claim 51 further comprises of a rear wing attached to the rear extension about the rear tip, and about perpendicular to the vertical stabilizer.

53. The airwing structure of claim 52 further comprises a rudder attached to the vertical stabilizer and an elevator attached to the rear wing.

54. The airwing structure of claim 53 wherein the leading bar is foldable to fold the airwing structure.

55. The airwing structure of claim 53 wherein the supporting bar is a fuselage.

56. The airwing structure of claim 43 wherein the airfoil is a parafoil comprising of an air inflatable airfoil-shaped canopy, wherein the leading edge has an air intake opening allowing the air to inflate the airfoil-shaped canopy.

57. The airwing structure of claim 56 wherein the inflatable airfoil-shaped canopy further comprises of a top skin, a bottom skin, and a plurality of air cells extending from about the leading edge to about the trailing edge, wherein the air cells comprises of ribs formed of substantially airfoil shape, and wherein the ribs are connected between the top skin and the bottom skin forming the air cells.

58. The airwing structure of claim 57 wherein the means for providing a downward and a forward tension is also used to move the left edge and the right edge to control the lift and the movement of the airwing structure.

59. The airwing structure of claim 58 further comprising a means for thrusting the airwing structure.

60. The airwing structure of claim 59 wherein the thrusting means is attached to the forward tip of the forward extension.

61. The airwing structure of claim 59 wherein the thrusting means is attached to the rear tip of the rear extension.

62. The airwing structure of claim 59 further comprising a load bearing member having an upper end and a lower end, wherein the load bearing member is attached to the supporting bar by the upper end.

63. The airwing structure of claim 62 wherein the load bearing member is attached to the supporting bar between about the junction and the rear tip.

64. The airwing structure of claim 63 wherein the load bearing member is attached to the supporting bar about the center of gravity for the airfoil.

65. The airwing structure of claim 64 further comprises of a load attached to about the lower end, wherein the thrusting means is attached to the load.

66. The airwing structure of claim 64 further comprises of a means for carrying a load attached to about the lower end, wherein the thrusting means is attached to the load carrying means.

67. The airwing structure of claim 66 wherein the leading bar is foldable to fold the airwing structure.

68. The airwing structure of claim 66 wherein the supporting bar is a fuselage.

69. An airwing structure comprising:
   a. an airfoil structure having a downward arc for producing lift by aerodynamic forces exerted thereon, wherein the airfoil structure has a leading edge, a trailing edge, a left edge, a right edge, a central wing root, a thrust line, a left wing portion, a right wing portion, and a plurality of chord lines, and wherein the airfoil structure comprises of a substantially flexible surface skin;
   b. a main frame attached to the airfoil structure comprising a leading bar and a supporting bar joined together forming a junction, the supporting bar having a forward extension and a rear extension, the forward extension having a forward tip and the rear extension having a rear tip, wherein the forward extension extends beyond the leading edge opposite from the rear extension, wherein the leading bar is fixedly attached to about the leading edge supporting and maintaining the leading edge from collapsing, and wherein the rear extension is attached to about the trailing edge supporting and maintaining the airfoil structure from collapsing;
   c. a load bearing member having an upper end and a lower end, wherein the load bearing member is rotatably attached to the supporting bar by the upper end;
   d. a means for providing a downward and a forward tension on the leading bar substantially about the left edge and substantially about the right edge of the airfoil structure to tighten the substantially flexible surface skin so the chord lines of a substantial portion of the airfoil structure are aligned with the central wing root and the thrust line to have the same angle of attack during the flight condition; and
   e. a means for controlling the airfoil structure attached to the load bearing member.

70. The airwing structure of claim 69 wherein the airfoil structure further comprises of a left stiffening rod and a right stiffening rod, the left stiffening rod attached to the leading edge and to the left edge substantially towards the trailing edge and the right stiffening rod attached to the leading edge and to the right edge substantially towards the trailing edge, wherein the left stiffening rod and the right stiffening rod tightens the trailing edge and gives stiffness to the left edge and the right edge respectively.

71. The airwing structure of claim 69 wherein the airfoil structure further comprises of a single stiffening rod having a left stiffening section and a right stiffening section, the single stiffening rod attached to the leading edge and the left stiffening section is attached to the left edge substantially towards the trailing edge while the right stiffening section is attached to the right edge substantially towards the trailing edge, wherein the left stiffening section and the right stiffening section tighten the trailing edge and give stiffness to the left edge and the right edge respectively.

72. The airwing structure of claim 70 wherein the load bearing member is attached to the supporting bar between about the junction and the rear tip.

73. The airwing structure of claim 72 wherein the load bearing member is attached to the supporting bar about the center of gravity for the airfoil.

74. The airwing structure of claim 73 further comprises of a load attached to about the lower end, wherein the thrusting means is attached to the load.

75. The airwing structure of claim 73 further comprises of a means for carrying a load attached to about the lower end, wherein the thrusting means is attached to the load carrying means.

76. The airwing structure of claim 75 wherein the controlling means is attached on or near the load carrying means, wherein the controlling means comprises of a control arm having a left tip and a right tip, a left tension bearing member, and a right tension bearing member, whereby the left tension bearing member is attached about the left tip or the left wing portion and the right tension bearing member is attached about the right tip or the right wing portion so that a rotation of the control arm controls the airwing structure by adjusting the tension on either or both the left tension bearing member and the right tension bearing member.

77. The airwing structure of claim 76 further comprises of a vertical stabilizer attached to the rear extension about the rear tip.

78. The airwing structure of claim 77 further comprises of a rear wing attached to the rear extension about the rear tip, and about perpendicular to the vertical stabilizer.

79. The airwing structure of claim 78 further comprises a rudder attached to the vertical stabilizer and an elevator attached to the rear wing.

80. The airwing structure of claim 79 wherein the leading bar is foldable to fold the airwing structure.

81. The airwing structure of claim 70 wherein the airfoil is a parafoil comprising of an air inflatable airfoil-shaped canopy, wherein the leading edge has an air intake opening allowing the air to inflate the airfoil-shaped canopy.

82. The airwing structure of claim 81 wherein the inflatable airfoil-shaped canopy further comprises of a top skin, a bottom skin, and a plurality of air cells extending from about the leading edge to about the trailing edge, wherein the air cells comprises of ribs formed of substantially airfoil shape, and wherein the ribs are connected between the top skin and the bottom skin forming the air cells.

83. The airwing structure of claim 82 wherein the load bearing member is attached to the supporting bar between about the junction and the rear tip.

84. The airwing structure of claim 83 wherein the load bearing member is attached to the supporting bar about the center of gravity for the airfoil.

85. The airwing structure of claim 84 further comprises of a load attached to about the lower end, wherein the thrusting means is attached to the load.

86. The airwing structure of claim 85 further comprises of a means for carrying a load attached to about the lower end, wherein the thrusting means is attached to the load carrying means.

87. The airwing structure of claim 86 wherein the controlling means is attached on or near the load carrying means, wherein the controlling means comprises of a control arm having a left tip and a right tip, a left tension bearing member, and a right tension bearing member, whereby the left tension bearing member is attached about the left tip or the left wing portion and the right tension bearing member is attached about the right tip or the right wing portion so that a rotation of the control arm controls the airwing structure by adjusting the tension on either or both the left tension bearing member and the right tension bearing member.

88. The airwing structure of claim 87 further comprises of a vertical stabilizer attached to the rear extension about the rear tip.

89. The airwing structure of claim 88 further comprises of a rear wing attached to the rear extension about the rear tip, and about perpendicular to the vertical stabilizer.

90. The airwing structure of claim 89 further comprises a rudder attached to the vertical stabilizer and an elevator attached to the rear wing.

91. The airwing structure of claim 90 wherein the leading bar is foldable to fold the airwing structure.

92. An airwing structure comprising:
a. an airfoil structure having a downward arc for producing lift by aerodynamic forces exerted thereon, wherein the airfoil structure has a leading edge, a trailing edge, a left edge, a right edge, a central wing root, a thrust line, and a plurality of chord lines, and wherein the airfoil structure comprises of a substantially flexible surface skin;
b. a main frame attached to the airfoil structure comprising a leading bar and a supporting bar, wherein the leading bar is fixedly attached to about the leading edge supporting and maintaining the leading edge from collapsing, and wherein the supporting bar is attached to the leading bar and attached to about the trailing edge supporting and maintaining the airfoil structure from collapsing;
c. a secondary bar attached to the leading bar and attached to about the trailing edge supporting and maintaining the airfoil structure from collapsing;
d. a tertiary bar attached to the leading bar and attached to about the trailing edge supporting and maintaining the airfoil structure from collapsing;
e. a means for providing a downward and a forward tension on the leading bar substantially about the left edge and substantially about the right edge of the airfoil structure to tighten the substantially flexible surface skin so the chord lines of a substantial portion of the airfoil structure are aligned with the central wing root and the thrust line to have the same angle of attack during the flight condition; and
f. a means for thrusting the airwing structure attached to the airwing structure.

93. The airwing structure of claim 92 wherein the airfoil structure further comprises of a left stiffening rod and a right stiffening rod, the left stiffening rod attached to the leading edge and to the left edge substantially towards the trailing edge and the right stiffening rod attached to the leading edge and to the right edge substantially towards the trailing edge, wherein the left stiffening rod and the right stiffening rod tightens the trailing edge and gives stiffness to the left edge and the right edge respectively.

94. The airwing structure of claim 92 wherein the airfoil structure further comprises of a single stiffening rod having a left stiffening section and a right stiffening section, the single stiffening rod attached to the leading edge and the left stiffening section is attached to the left edge substantially towards the trailing edge while the right stiffening section is attached to the right edge substantially towards the trailing edge, wherein the left stiffening section and the right stiffening section tighten the trailing edge and give stiffness to the left edge and the right edge respectively.

95. The airwing structure of claim 93 wherein the means for thrusting comprises of a propeller attached to each of the secondary bar and the tertiary bar.

96. The airwing structure of claim 95 wherein the means for providing a downward and a forward tension is also used to move the left edge and the right edge to control the lift and the movement of the airwing structure.

97. The airwing structure of claim 96 wherein the airfoil is a parafoil comprising of an air inflatable airfoil-shaped canopy, wherein the leading edge has an air intake opening allowing the air to inflate the airfoil-shaped canopy.

98. The airwing structure of claim 97 wherein the inflatable airfoil-shaped canopy further comprises of a top skin, a bottom skin, and a plurality of air cells extending from about the leading edge to about the trailing edge, wherein the air cells comprises of ribs formed of substantially airfoil shape, and wherein the ribs are connected between the top skin and the bottom skin forming the air cells.

99. The airwing structure of claim 98 wherein the ribs of the air cells have one or more communicating holes wherein the communicating holes allow the air communication between two adjacent air cells.

100. The airwing structure of claim 99 wherein the leading bar is foldable to fold the airwing structure.

101. The airwing structure of claim 98 wherein the supporting bar is a fuselage.

102. The airwing structure of claim 101 further comprising of a vertical stabilizer attached to each of the secondary bar and the tertiary bar, and a rear wing attached between the two vertical stabilizers.

103. The airwing structure of claim 102 further comprising a rudder on each of the vertical stabilizers, and an elevator attached on the rear wing.

* * * * *